US012397720B2

(12) United States Patent
Kuschmeader et al.

(10) Patent No.: US 12,397,720 B2
(45) Date of Patent: Aug. 26, 2025

(54) UTILITY RACK

(71) Applicant: Kuat Innovations LLC, Springfield, MO (US)

(72) Inventors: Luke Kuschmeader, Springfield, MO (US); Jonathan Graif, Springfield, MO (US); Patrick Schloth, Louisville, CO (US); Aaron Houston, Springfield, MO (US); Clayton Villars, Springfield, MO (US)

(73) Assignee: Kuat Innovations LLC, Springfield, MO (US)

( * ) Notice: Subject to any disclaimer, the term of this patent is extended or adjusted under 35 U.S.C. 154(b) by 312 days.

(21) Appl. No.: 18/182,123

(22) Filed: Mar. 10, 2023

(65) Prior Publication Data
US 2023/0286444 A1   Sep. 14, 2023

Related U.S. Application Data

(60) Provisional application No. 63/319,751, filed on Mar. 14, 2022.

(51) Int. Cl.
B60R 9/06         (2006.01)
B60R 9/045        (2006.01)

(52) U.S. Cl.
CPC ............... B60R 9/06 (2013.01); B60R 9/045 (2013.01)

(58) Field of Classification Search
CPC ................................. B60R 9/06; B62D 33/044
(Continued)

(56) References Cited

U.S. PATENT DOCUMENTS 2,489,670 A * 11/1949 Powell, Jr. ............. B65D 90/08
                                                   52/282.4
2,720,414 A   10/1955 Hart
(Continued)

OTHER PUBLICATIONS

Todd Lassa, "The Jeep Wayout is the Overland Gladiator Pickup of Our Dreams", Web page, https://www.motortrend.com/news/jeep-wayout-concept-overland-gladiator-moab-easter-safari-photos?galleryimageid=5ac8eaf5-f28e-4693-956e-a7fa72743f4c, 8 pages, published by Motortrend on Apr. 8, 2019, retrieved on Sep. 29, 2022.

(Continued)

Primary Examiner — Justin M Larson
(74) Attorney, Agent, or Firm — James H Jeffries; Kutak Rock LLP

(57) ABSTRACT

A utility rack for a truck may be removably attached to the side walls of the bed of the truck. The disclosed utility rack discloses internal cavities for attachment bolts or other fasteners. The internal cavities allow the fasteners to be hidden under an access cover during use of the utility rack while also providing strong and secure butt joints between the ends of some of the components. The ends of the components of the utility rack may be provided with protrusions and sockets that interlock to improve the stability of flush butt joints between components. The utility rack may include closed-loop outer-boundary side frames configure to clamp on opposing side walls of a truck cargo bed, with a crossbar spanning the truck cargo bed between top rails of the side frames. The closed-loop outer-boundary side frames do not require internal vertically oriented support posts inside the outer-boundary frame.

7 Claims, 29 Drawing Sheets

(58) Field of Classification Search
USPC ............ 224/403, 405; 296/3; D12/406, 412; 403/205, 231
See application file for complete search history.

(56) References Cited

U.S. PATENT DOCUMENTS

| | | | |
|---|---|---|---|
| 4,065,041 A * | 12/1977 | Stegavig | B60R 9/00 |
| | | | 296/3 |
| 4,356,648 A * | 11/1982 | Beaulieu | A47G 1/0605 |
| | | | 40/792 |
| 4,639,034 A | 1/1987 | Amos | |
| 5,002,324 A | 3/1991 | Griffin | |
| 5,009,457 A * | 4/1991 | Hall | B60J 7/141 |
| | | | 296/3 |
| 5,037,152 A | 8/1991 | Hendricks | |
| 5,137,320 A | 8/1992 | Christensen | |
| 5,143,415 A | 9/1992 | Boudah | |
| D362,654 S | 9/1995 | Keith | |
| 5,516,225 A * | 5/1996 | Kvols | A47B 47/0008 |
| | | | 403/231 |
| 5,732,496 A * | 3/1998 | Tanaka | A47G 1/101 |
| | | | 40/784 |
| 5,934,735 A * | 8/1999 | Wheatley | B60J 7/102 |
| | | | 296/100.18 |
| 5,938,365 A * | 8/1999 | Grewe | G09F 15/0012 |
| | | | 403/231 |
| 6,439,646 B1 | 8/2002 | Cornelius | |
| 6,513,849 B2 | 2/2003 | Carter | |
| 6,586,629 B1 | 7/2003 | Coufal | |
| 6,752,301 B1 * | 6/2004 | Drolet | B60P 3/40 |
| | | | 224/403 |
| D493,414 S * | 7/2004 | Condos | D12/406 |
| D530,193 S * | 10/2006 | Goldenberg | D8/400 |
| 7,198,185 B2 * | 4/2007 | Storer | B60R 9/00 |
| | | | 224/403 |
| 7,322,499 B2 | 1/2008 | Storer | |
| 7,464,977 B1 | 12/2008 | Price | |
| 7,494,169 B2 | 2/2009 | Collins | |
| D633,427 S | 3/2011 | Marr, Jr. | |
| 7,946,457 B2 * | 5/2011 | Kramer | B60R 9/00 |
| | | | 224/325 |
| 7,988,218 B1 | 8/2011 | Devine | |
| 8,172,477 B2 * | 5/2012 | Damsi | B62D 33/0207 |
| | | | 403/205 |
| 8,322,582 B2 | 12/2012 | Flaherty | |
| 8,668,125 B2 | 3/2014 | Williams | |
| 8,777,288 B2 | 7/2014 | Johnasen | |
| 9,248,785 B2 | 2/2016 | Perry | |
| 9,321,493 B2 * | 4/2016 | Dost | B60R 9/065 |
| 9,566,914 B2 | 2/2017 | Marr, Jr. | |
| 9,586,629 B2 | 3/2017 | Leitner | |
| 10,131,287 B1 | 11/2018 | Marino | |
| 10,173,505 B2 | 1/2019 | Singer | |
| 10,207,650 B1 | 2/2019 | Banegas | |
| 10,252,679 B2 | 4/2019 | Singer | |
| 10,421,385 B2 | 9/2019 | Chambers | |
| D908,072 S * | 1/2021 | Connellan | D12/412 |
| D920,886 S * | 6/2021 | Clarke | D12/406 |
| D924,120 S | 7/2021 | Voss | |
| 11,377,160 B2 | 7/2022 | Leitner | |
| D1,007,396 S * | 12/2023 | Geiger | D12/406 |
| D1,010,548 S * | 1/2024 | Kuschmeader | D12/412 |
| D1,037,987 S * | 8/2024 | Kuschmeader | D12/412 |
| 12,110,065 B2 * | 10/2024 | Roberson | B60R 9/06 |
| 12,122,328 B1 * | 10/2024 | Littrell | B60R 9/00 |
| 2002/0163214 A1 | 11/2002 | Carter | |
| 2004/0211802 A1 | 10/2004 | Levi | |
| 2008/0100075 A1 | 5/2008 | Derektor | |
| 2009/0026784 A1 | 1/2009 | Green | |
| 2010/0072237 A1 | 3/2010 | Green | |
| 2010/0288808 A1 | 11/2010 | Marr, Jr. | |
| 2013/0114997 A1 * | 5/2013 | Yue | B60J 7/102 |
| | | | 403/205 |
| 2013/0229025 A1 | 9/2013 | Johnasen | |
| 2014/0034696 A1 | 2/2014 | Marr et al. | |
| 2014/0367990 A1 | 12/2014 | Dost | |
| 2015/0197202 A1 | 7/2015 | Harrison | |
| 2015/0258940 A1 | 9/2015 | Breeden, III et al. | |
| 2017/0166105 A1 | 6/2017 | Puchkoff | |
| 2019/0105971 A1 | 4/2019 | Singer | |
| 2019/0367100 A1 | 12/2019 | Condon et al. | |
| 2021/0039721 A1 | 2/2021 | Foreman | |
| 2021/0114445 A1 | 4/2021 | Deckard | |
| 2021/0129643 A1 | 5/2021 | Voss | |
| 2022/0001938 A1 | 1/2022 | Condon et al. | |
| 2022/0185394 A1 | 6/2022 | Champa | |
| 2023/0286444 A1 * | 9/2023 | Kuschmeader | B60R 9/00 |
| 2024/0375725 A1 * | 11/2024 | Kuschmeader | B62D 33/0207 |

OTHER PUBLICATIONS

Fab Fours, "Fab Fours Channel", Screen shot from web video, https://www.youtube.com/watch?v=rz9hFDh5VTc, 1 page, published on Oct. 11, 2021, retrieved on Oct. 17, 2022.

Written Opinion of the International Searching Authority in International Application No. PCT/US2023/064234, mailed on Aug. 10, 2023.

International Search Report in International Application No. PCT/US2023/064234, mailed on Aug. 10, 2023.

* cited by examiner

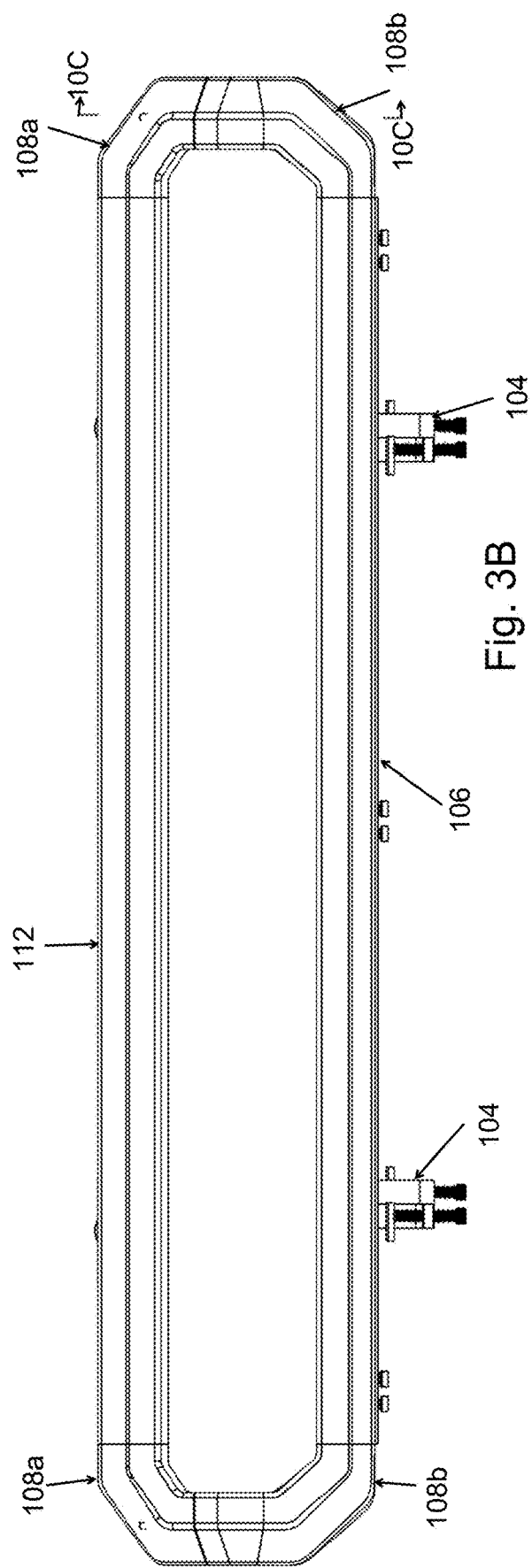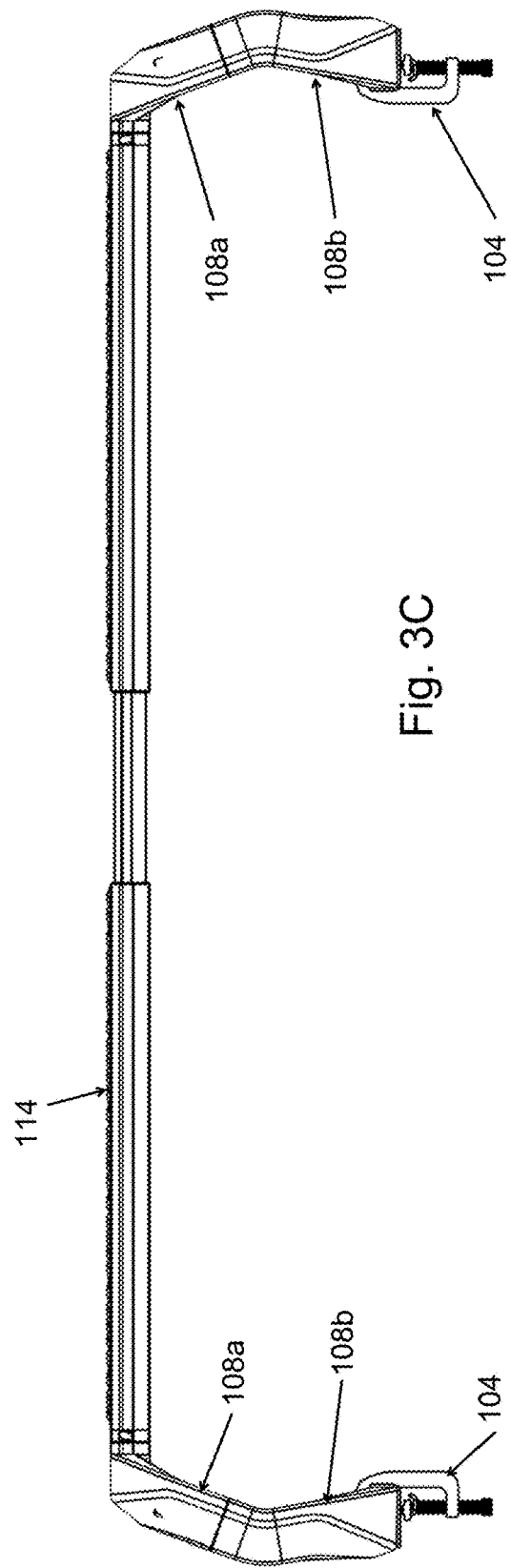
Fig. 3B
Fig. 3C

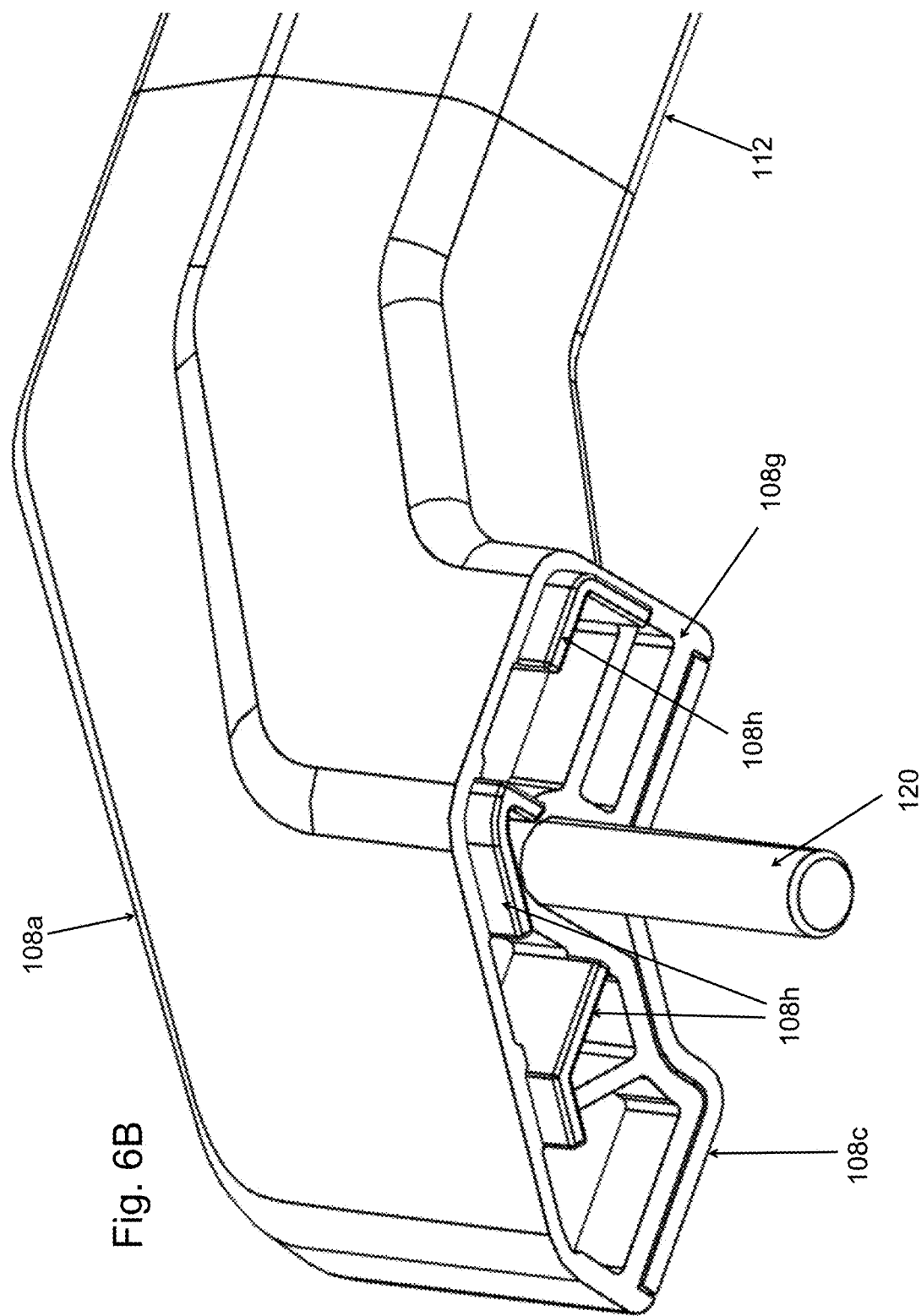

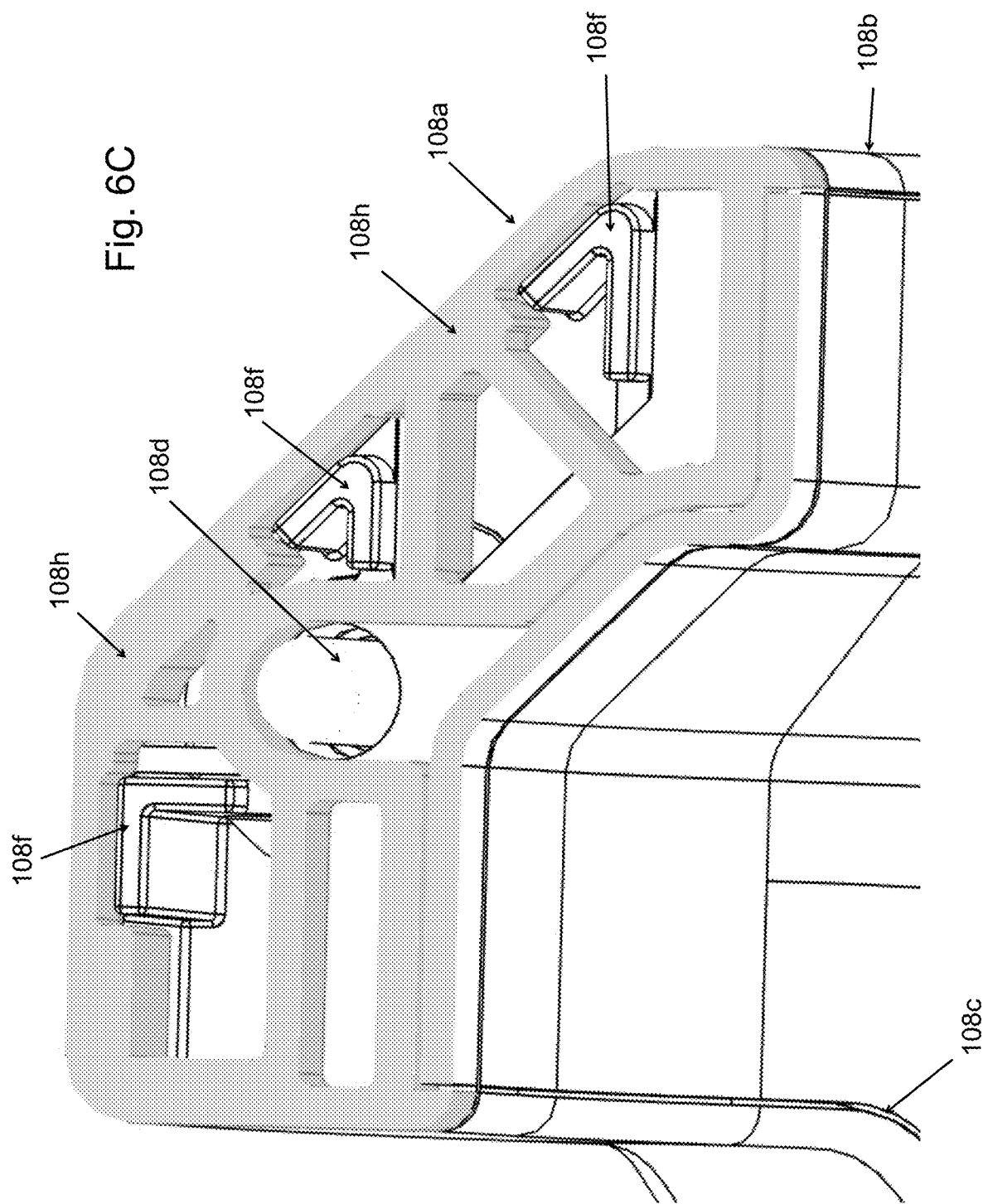

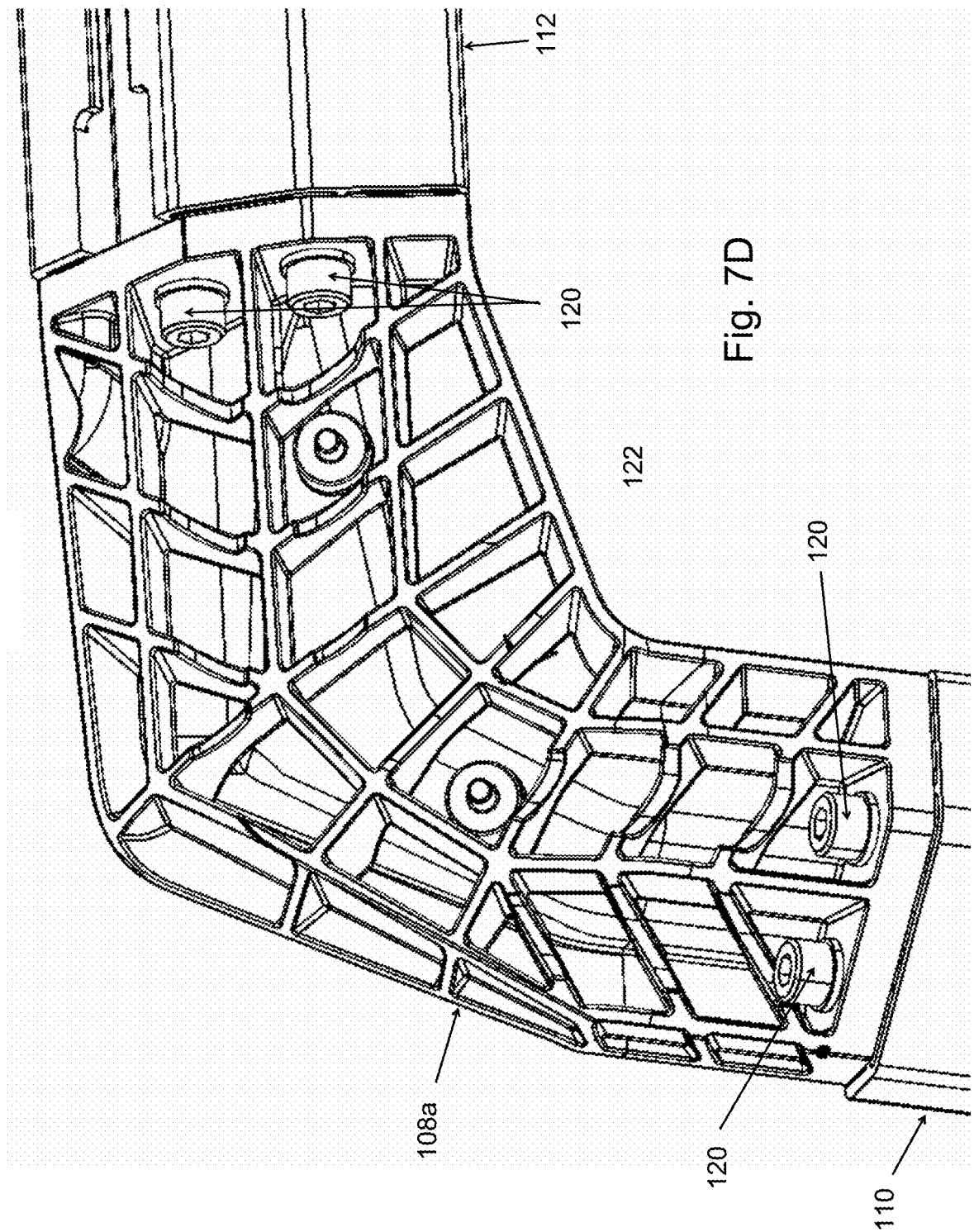

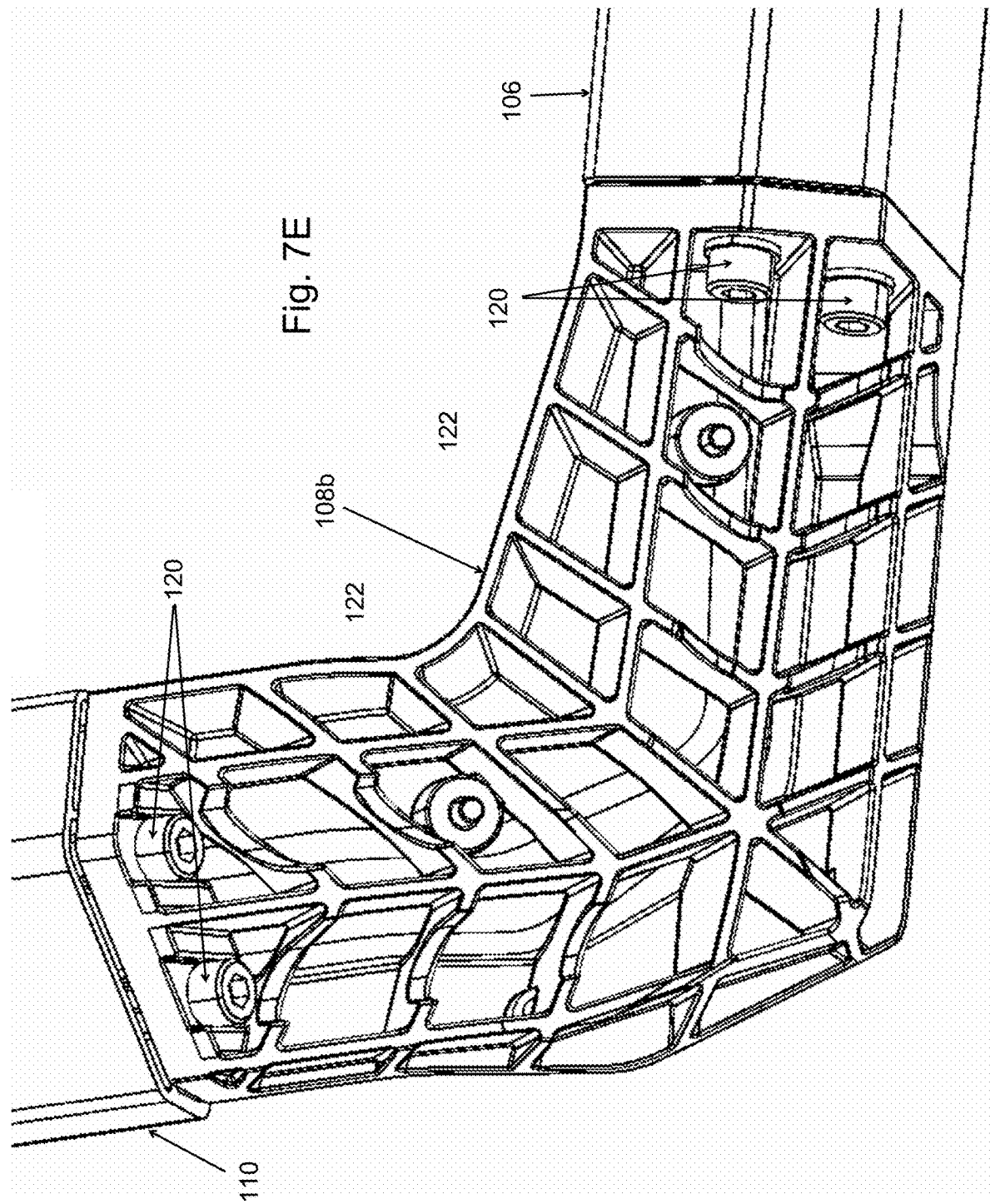

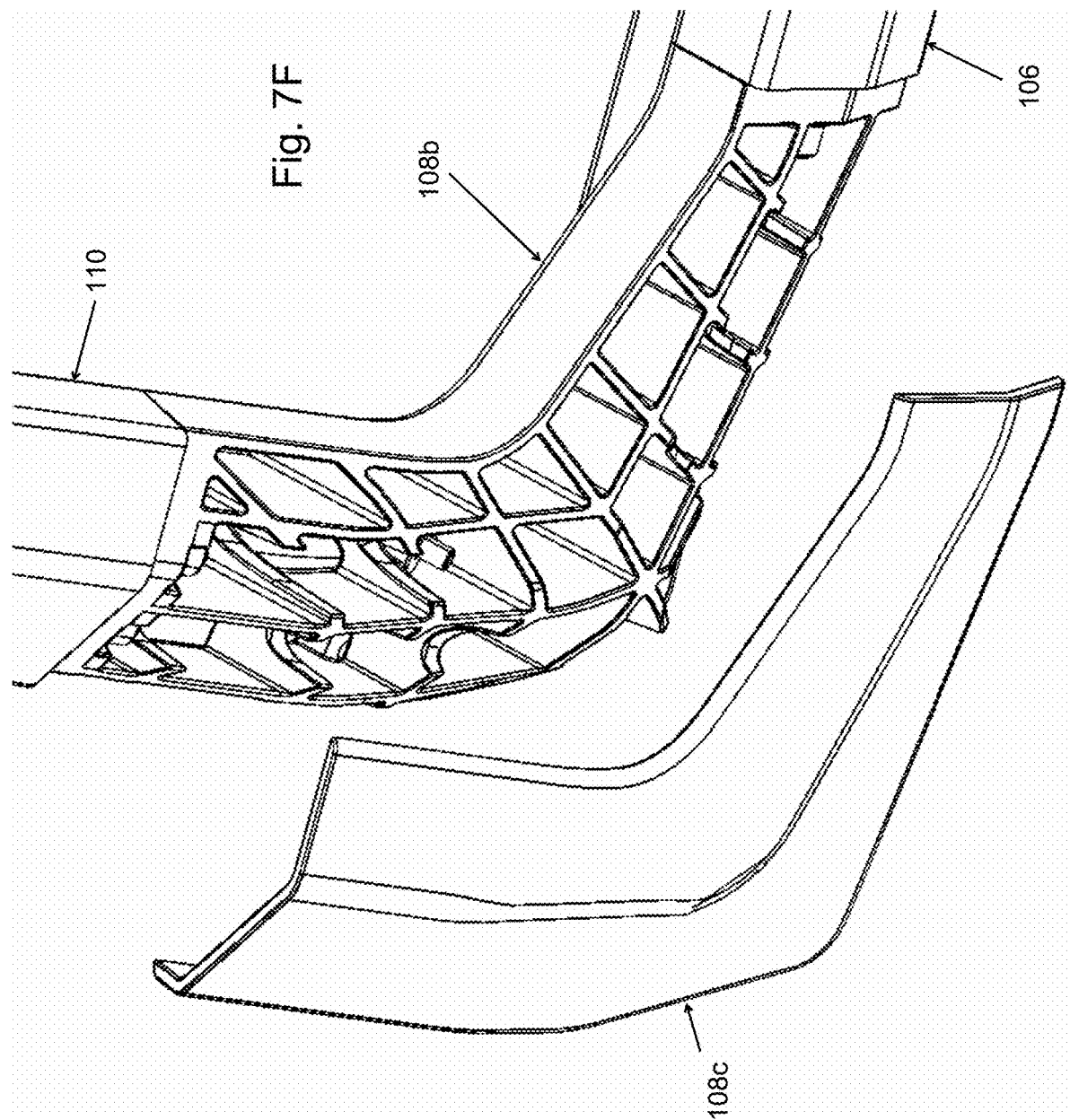

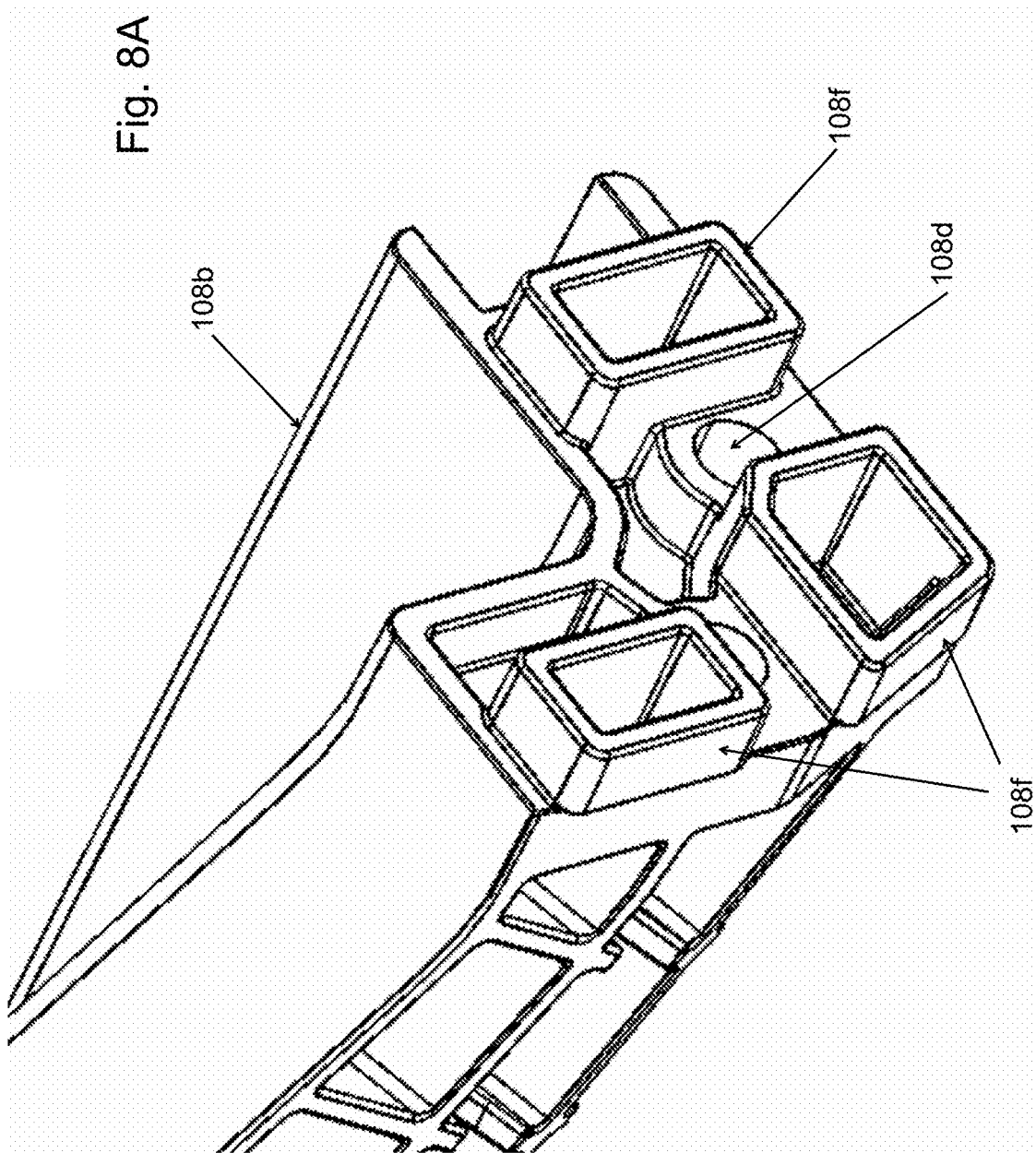

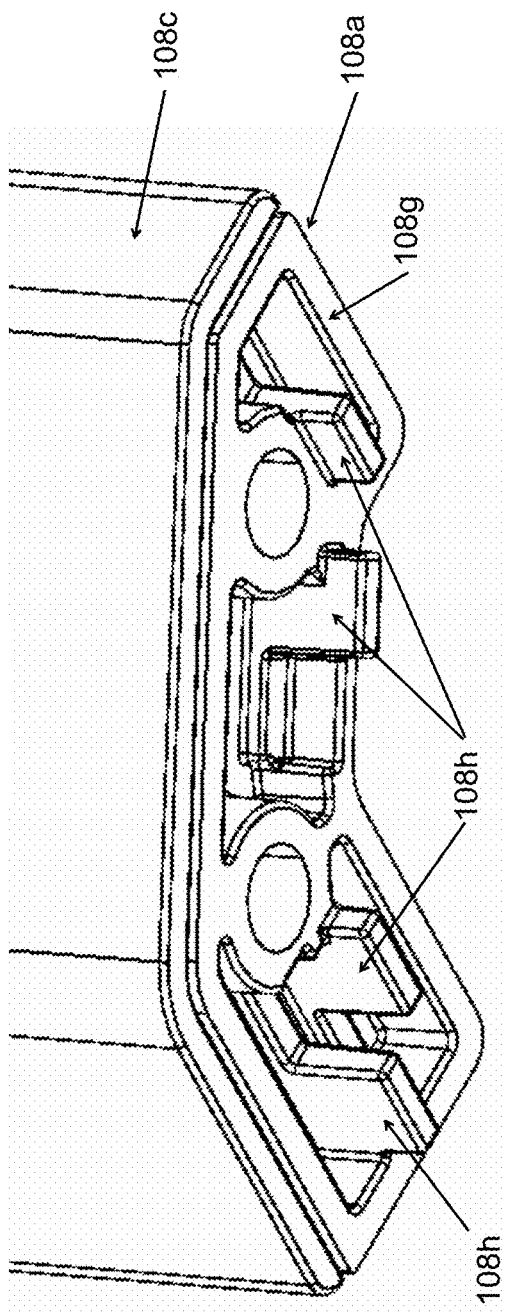
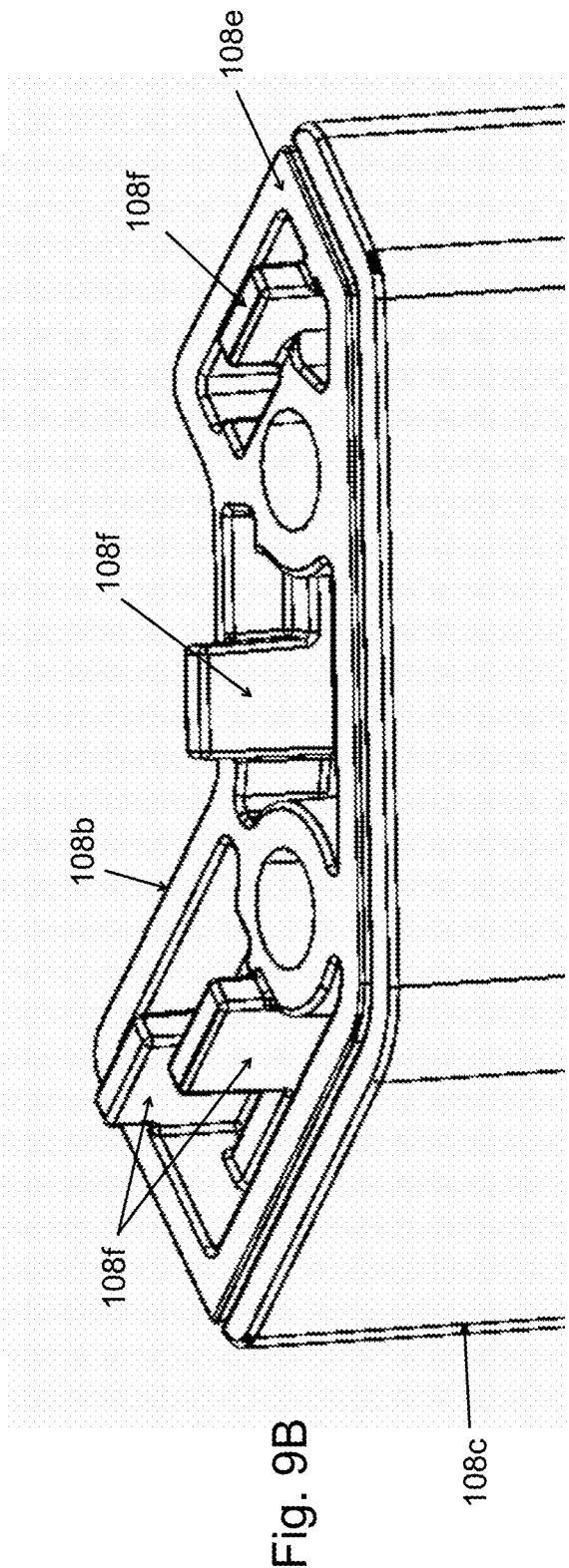
Fig. 9A
Fig. 9B

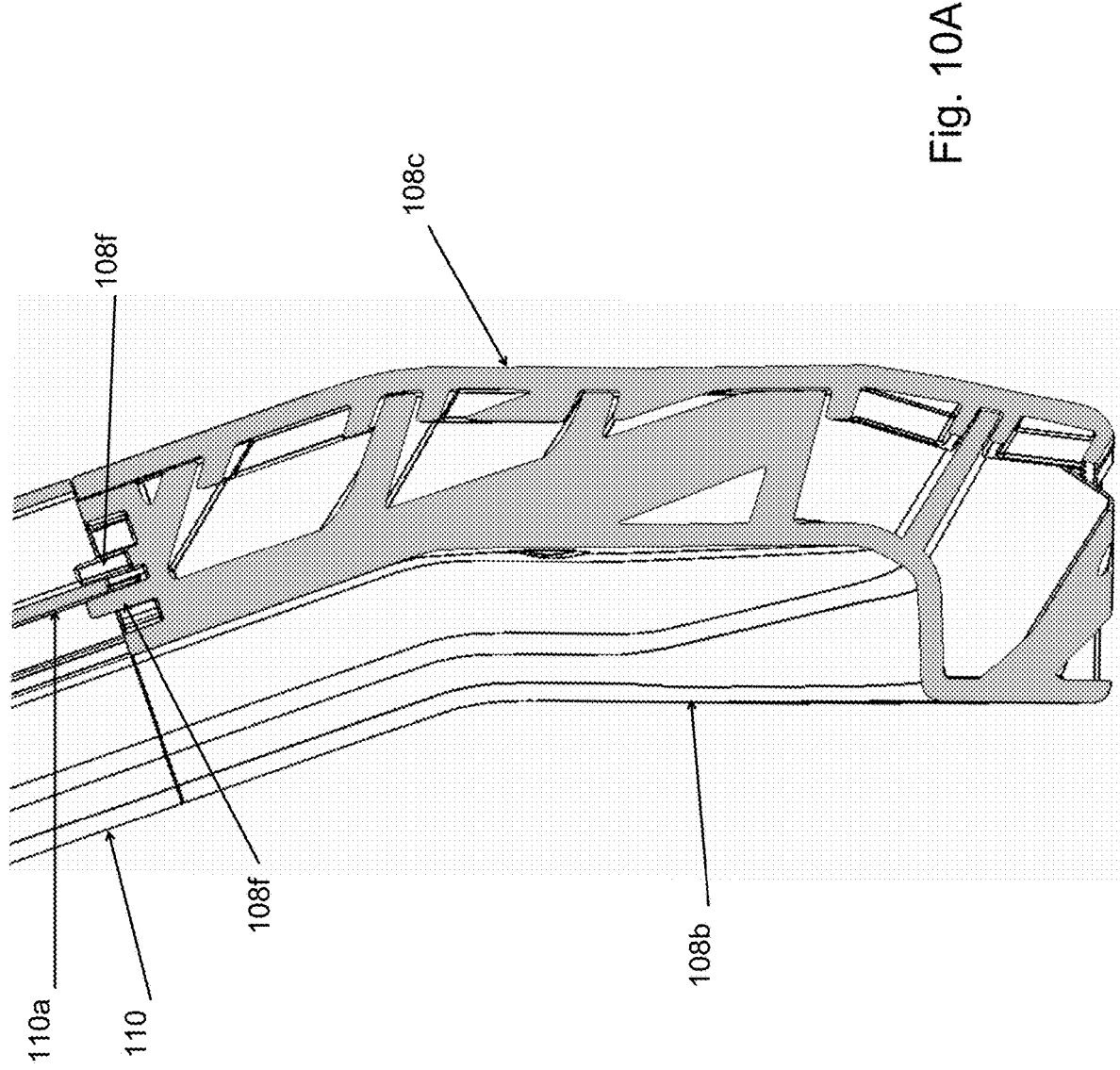

UTILITY RACK

CROSS-REFERENCE TO RELATED APPLICATIONS

This application claims the benefit of priority of U.S. Provisional Patent Application Ser. No. 63/319,751 filed on Mar. 14, 2022.

BACKGROUND

Field of the Invention

This disclosure is in the field of utility racks for vehicles such as trucks. This disclosure includes utility racks that are customizable, extensible, and reconfigurable. More specifically, this disclosure is in the field of utility racks for trucks for carrying items such as ladders, canoes, kayaks, roof top tents, bicycles, cargo boxes, tools, gas tanks, water tanks, overland equipment, outdoor recreational equipment, and other similar items.

SUMMARY OF THE INVENTION

In various embodiments, the invention comprises a utility rack for a truck, the truck having a cargo bed, some embodiments of the utility rack comprising a first multi-component side frame comprising a bottom rail, a top rail, a first and a second side post, a first and a second top elbow, and a first and a second bottom elbow attached at a plurality of joints, wherein the multi-component side frame is configured to attach to a first side wall of the cargo bed, and a first end of the bottom rail is attached to the first bottom elbow and a second end of the bottom rail is attached to the second bottom elbow, a first end of the top rail is attached to the first top elbow and a second end of the top rail is attached to the second top elbow, a bottom end of the first side post is attached to the first bottom elbow and a top end of the first side post is attached to the first top elbow, a bottom end of the second side post is attached to the second bottom elbow and a top end of the second side post is attached to the second top elbow, each of the plurality of joints is a substantially flush joint, and the bottom rail, the top rail, the first and second side posts, the first and second bottom elbows, and the first and second top elbows form a closed-loop, outer boundary of the side frame.

In some embodiments of the utility rack for a truck the first multi-component side frame is configured to support a cargo load on the top rail without additional vertical support between the bottom rail and the top rail. Some embodiments of the utility rack for a truck further comprise a second multi-component side frame configured to attach to a second side wall of the cargo bed, and a crossbar attached to the top rails of both of the first and second multi-component side frames, the crossbar configured to support a cargo load.

In some embodiments of the utility rack for a truck a plurality of clamps are attached to the bottom rails or the bottom elbows of the first and second multi-component side frames and configured to releasably attach to the side walls of the cargo bed.

In some embodiments of the utility rack for a truck at least one of the elbows comprises a cavity for receiving a fastener configured to attach through an aperture in the elbow to an adjacent rail or post of the side frame. Some embodiments of the utility rack for a truck further comprise an access panel removably attached to the at least one elbow over the cavity. In some embodiments of the utility rack for a truck the top and bottom elbows further comprise interlocking features for engaging sockets in the adjacent rail or post of the side frame.

Some embodiments of the utility rack for a truck comprise a top member, a bottom member, and two side members connected at their respective ends to form the outer boundary of a continuous side frame forming a first closed loop side assembly; a top member, a bottom member, and two side members connected at their respective ends to form the outer boundary of a continuous side frame forming a second closed loop side assembly; wherein each of the plurality of joints between the members in the side assemblies are substantially flush joints without external fasteners; wherein the bottom members of the first and second side assemblies are configured to clamp to the opposing side walls of the cargo bed; and wherein a crossbar spanning the cargo bed is attached to the top members of the first and second side assemblies.

In some embodiments of the utility rack each of the plurality of joints comprises an elbow connecting an end of a top or bottom member to an end of one of the side members; and each elbow further comprises an internal cavity for receiving a fastener, and an aperture from the internal cavity to an outer surface of the elbow for connecting the fastener to one of the members. In some of these embodiments of the utility rack each elbow further comprises a second aperture for a second fastener for connecting the elbow to another of the members.

In some embodiments of the utility rack the elbows further comprise one or more protrusions extending from the outer surface of the elbow into one or more sockets in the end of the adjacent member. In some embodiments of the utility rack the protrusions are configured to prevent rotation of the elbow and the member at the joint with respect to each other.

In some embodiments of the utility rack each of the plurality of elbows comprises a single unitary component, and wherein the aperture extends from the cavity to a portion of the outer surface of the elbow where the protrusions are disposed, the portion being configured to mate to an end of one of the members; and the end of the member further comprises a cavity for receiving the fastener to secure the joint. In some of these embodiments of the utility rack when the elbows are attached to the members the outer surface of the rack is substantially continuous.

Some embodiments of the utility rack for a truck having a cargo bed with opposing side walls comprise a first side frame assembly comprising a bottom rail, a top rail, a first and a second side post, a first and a second top elbow, and a first and a second bottom elbow, attached at a plurality of joints into a closed loop around an outer boundary of the side frame assembly; a first end of the bottom rail is attached to the first bottom elbow and a second end of the bottom rail is attached to the second bottom elbow; a first end of the top rail is attached to the first top elbow and a second end of the top rail is attached to the second top elbow; a bottom end of the first side post is attached to the first bottom elbow and a top end of the first side post is attached to the first top elbow; a bottom end of the second side post is attached to the second bottom elbow and a top end of the second side post is attached to the second top elbow; the side frame assembly is configured to removably attach to a side wall of the cargo bed; the bottom rail is configured to contact a top edge of the side wall of the cargo bed along substantially all of the length of the bottom rail; and each of the plurality of joints comprises a flush joint with interlocking features.

In some embodiments of the utility rack the first top elbow is configured to connect to the first bottom elbow when the first side post is removed, and the second bottom elbow is configured to connect to the second bottom elbow when the second side post is removed. In some embodiments the utility rack further comprises a second side frame assembly configured to attach to a second side wall of the cargo bed, and a crossbar removably attached to the top rails of the side frame assemblies.

In some embodiments of the utility rack each elbow further comprises an internal cavity and an access plate to cover the aperture, the internal cavity configured to receive a first fastener and a second fastener, and the internal cavity having a first and second aperture for connecting the first and second fastener to adjacent rails or side posts. In some of these embodiments of the utility rack the ends of top and bottom rail and the side posts further comprise threaded sockets for receiving a fastener extending from an aperture in an elbow. In some embodiments of the utility rack the access plate is flush with the adjacent outer surfaces of the elbow.

BRIEF DESCRIPTION OF THE DRAWINGS

FIG. 3B is a side view of an embodiment of the utility rack in a second configuration.

FIG. 3C is a front view of an embodiment of the utility rack in a first configuration.

FIG. 6B is a perspective view of a partially disassembled portion of an embodiment of the utility rack.

FIG. 6C is a cross-sectional view of a joint between two components of an embodiment of the utility rack.

FIG. 7D is a side view of a portion of an additional embodiment of the utility rack with an access panel removed.

FIG. 7E is a side view of a portion of an additional embodiment of the utility rack with an access panel removed.

FIG. 7F is a perspective, partially exploded view of an additional embodiment of the utility rack.

FIG. 8A is a detail, perspective view of a portion of an additional embodiment of the utility rack.

FIG. 9A is a detail, perspective view of a portion of an additional embodiment of the utility rack.

FIG. 9B is a detail, perspective view of a portion of an additional embodiment of the utility rack.

FIG. 10A is a cross-sectional view of a portion of an additional embodiment of the utility rack.

DETAILED DESCRIPTION

Figure 1:
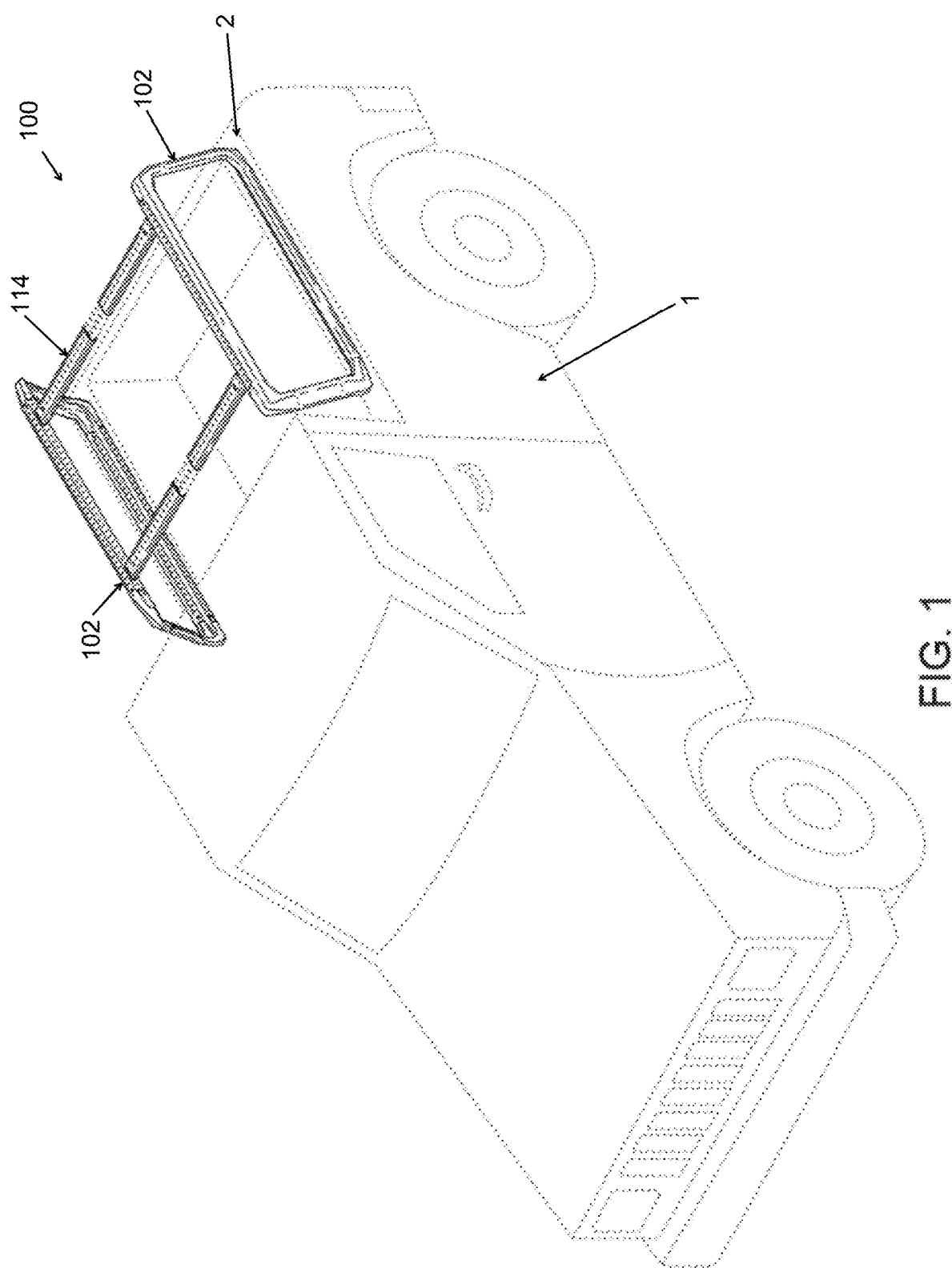
FIG. 1 is a perspective view of an embodiment of the utility rack installed on a truck.
Figure 2A:
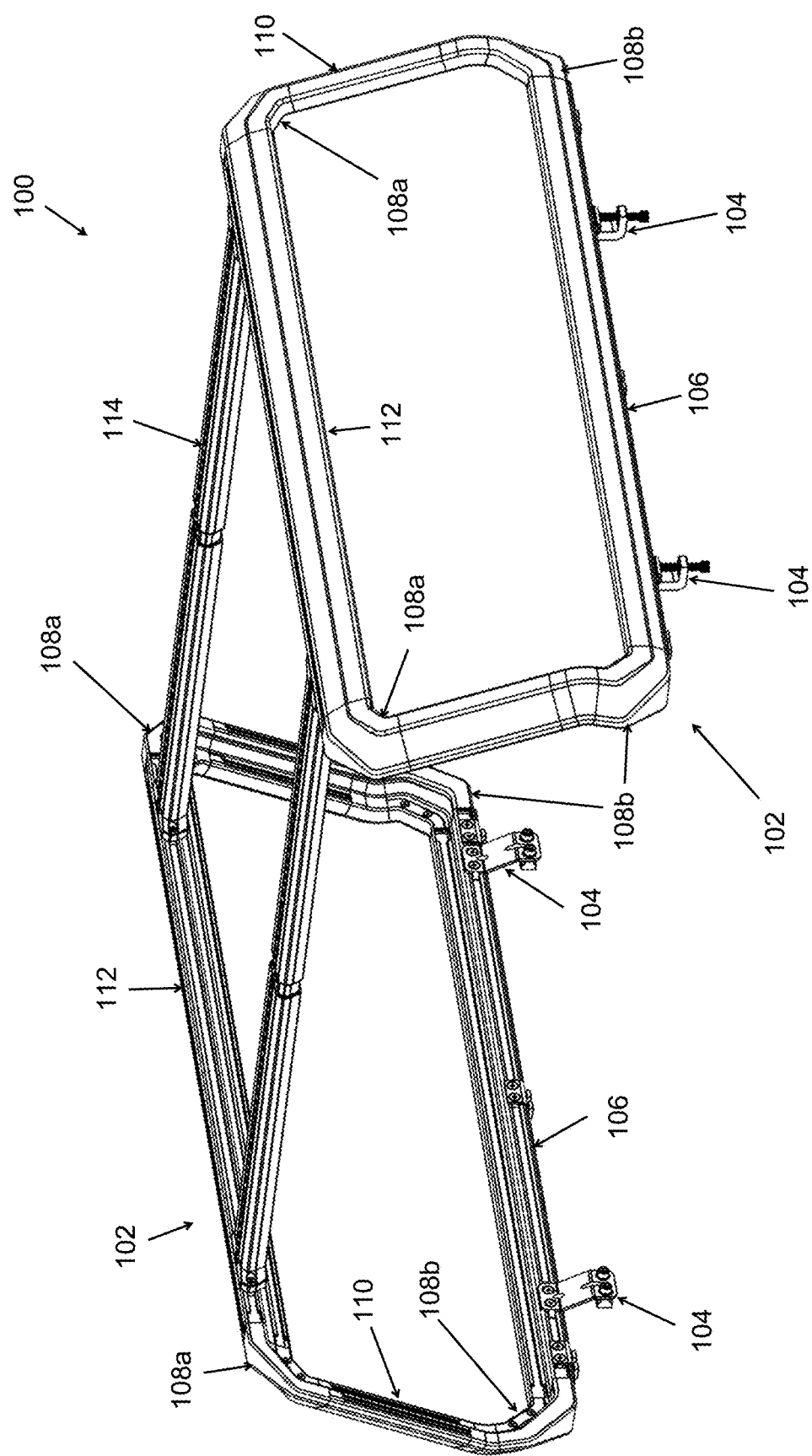
FIG. 2A is a perspective view of an embodiment of the utility rack in a first configuration.
Figure 2B:
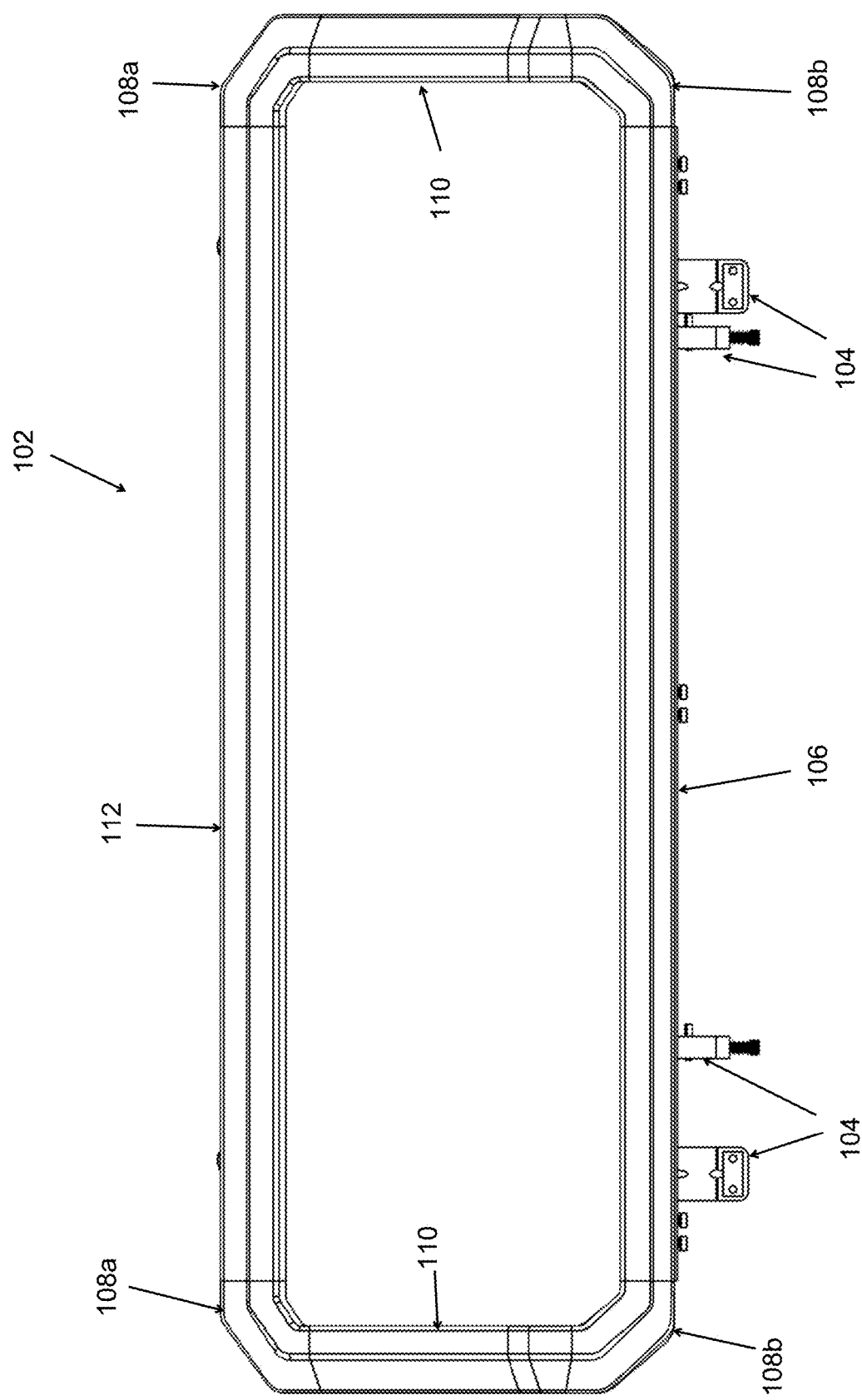
FIG. 2B is a side view of an embodiment of the utility rack in a first configuration.
Figure 2C:
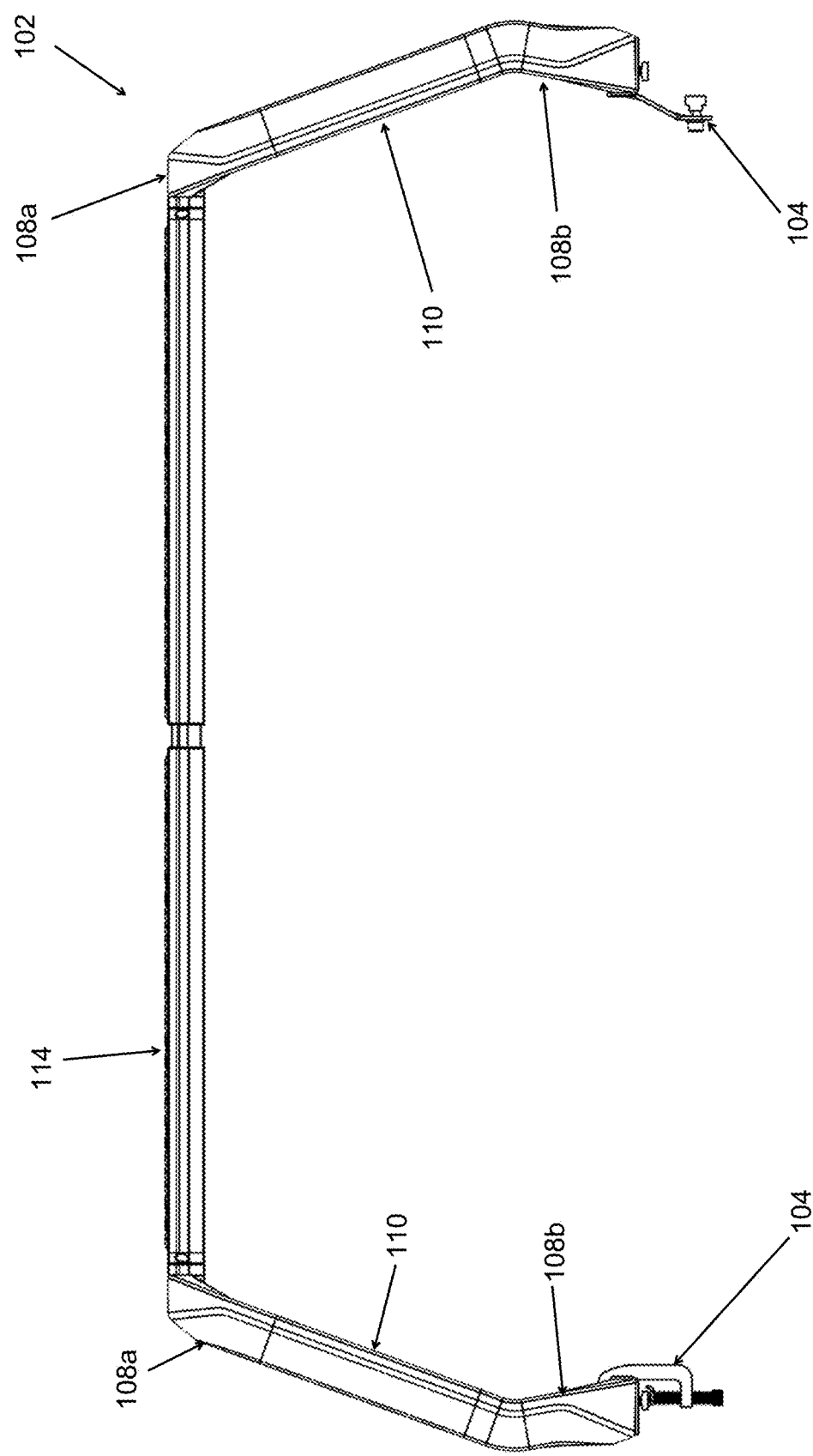
FIG. 2C is a front view of an embodiment of the utility rack in a first configuration.
Figure 2D:
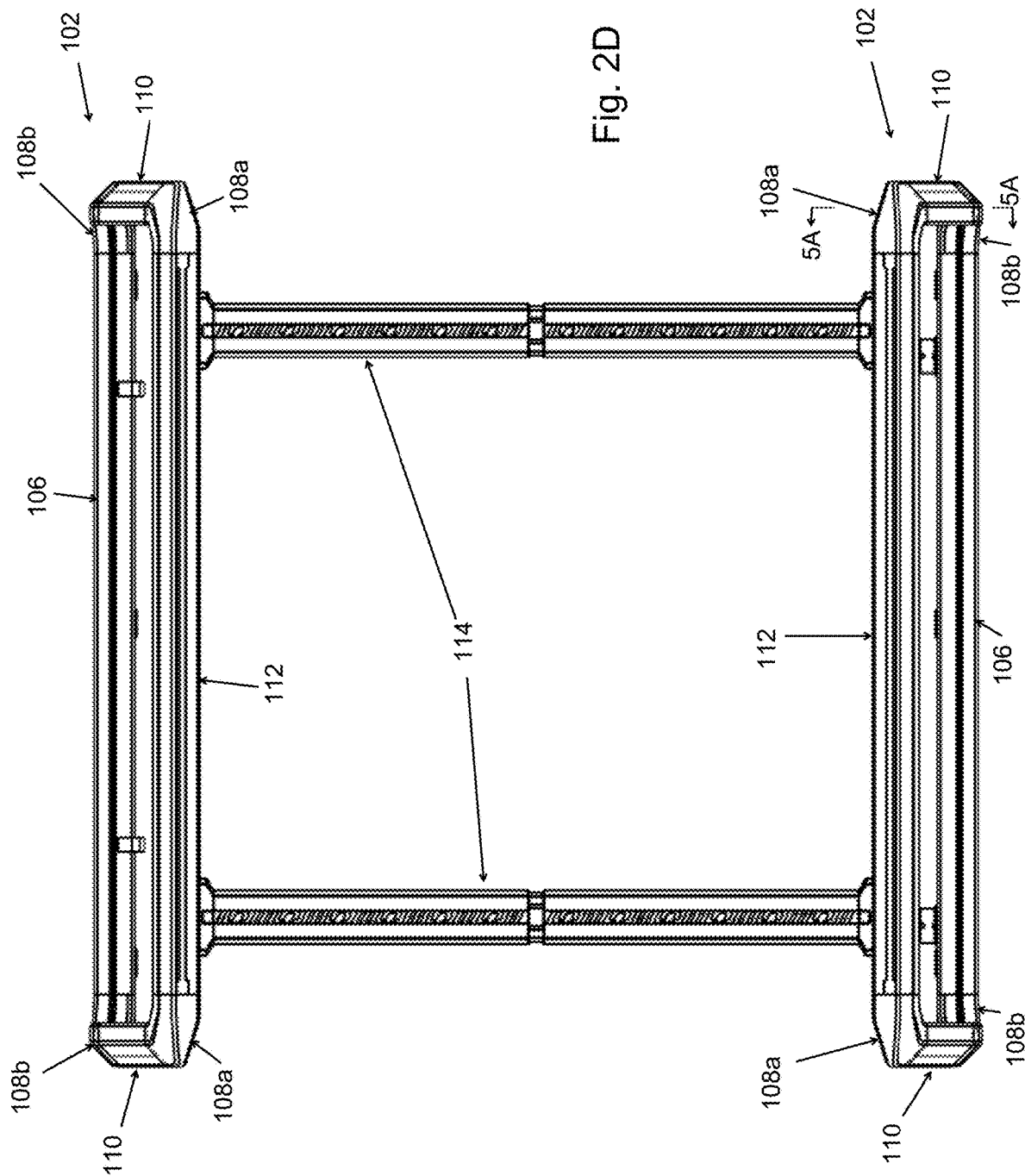
FIG. 2D is a top view of an embodiment of the utility rack in a first configuration.
Figure 2E:
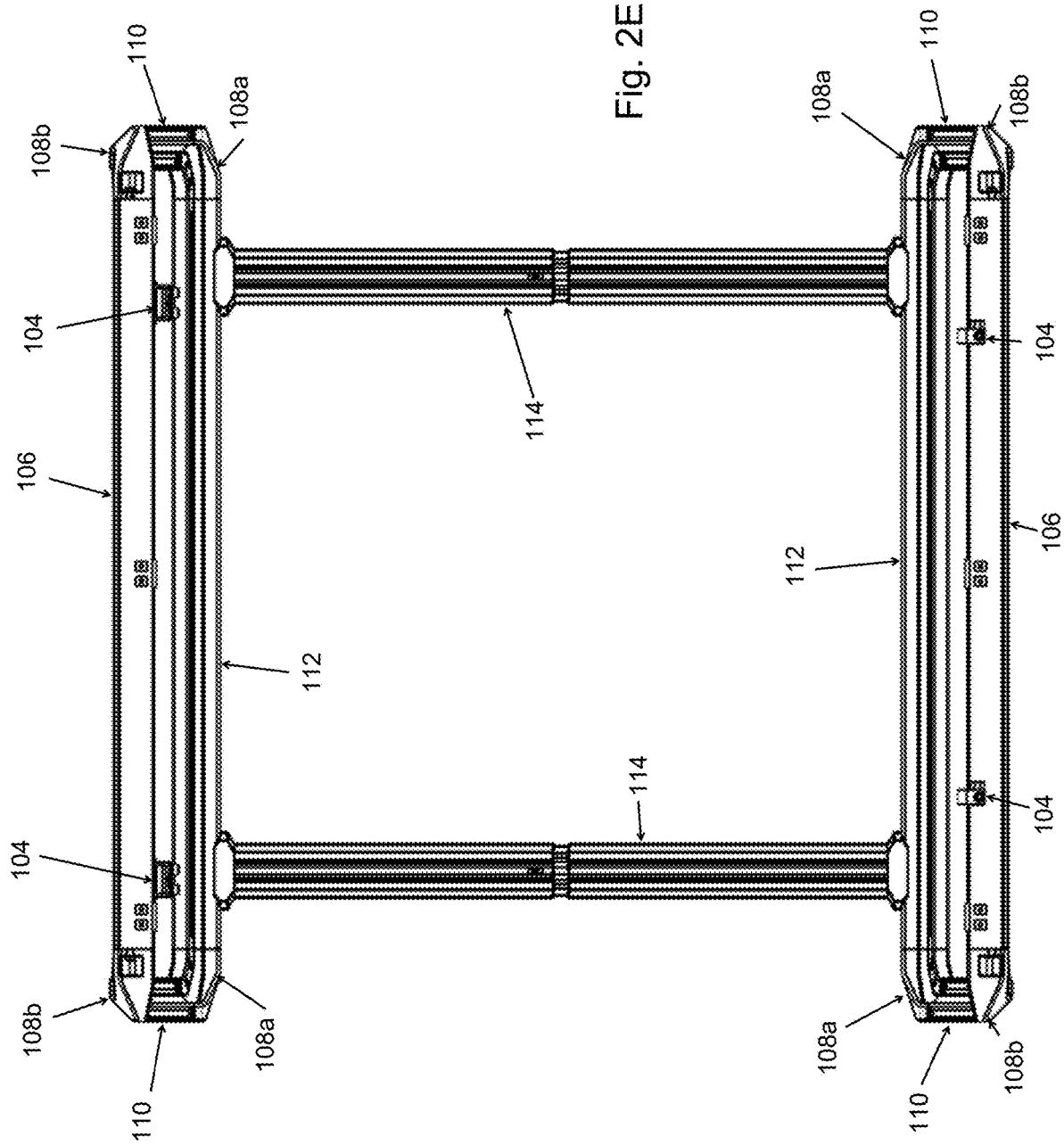
FIG. 2E is a bottom view of an embodiment of the utility rack in a first configuration.

FIG. 1 depicts an embodiment of the inventive utility rack 100 installed on a truck 1. The depicted embodiment includes two side frames 102 removably attached to the truck 1 on the top edge of opposing side walls 2 of the cargo bed of the truck 1. The side assemblies are connected by crossbars 114. The crossbars in FIG. 1 are shown partially in dashed lines to denote extendibility for differing truck cargo bed dimensions, but the crossbars do extend all the way between the two side assemblies as shown in later figures. The side frames 102 may also be referred to as side assemblies and they are formed from multiple components that are attached together by bolts or other fasteners as described herein.

FIGS. 2A through 2E depict a first embodiment of the inventive utility rack 100 in a first configuration. This embodiment of the utility rack 100 comprises two side assemblies 102 that are provided with attachment mechanisms 104 for releasable attachment to the side walls 2 of the cargo bed of a truck. The attachment mechanisms 104 may be clamps to pull the bottom rail 106 of the side frame 102 against the side wall 2, adapters for T-channels or similar channels in the wall of the truck bed, or other similar mechanisms in varying embodiments of the inventive rack 100. In some embodiments the attachment mechanisms translate along channels (such as T-channels) in, or may be attached at multiple points to, the length of the bottom rails 106 of the side assemblies 102.

Each of the depicted side assemblies 102 are formed from a bottom rail 106, two bottom elbows 108b, two side posts 110, two top elbows 108a, and top rail 112. In other embodiments of the side frames 102 may be composed of different types and configurations of components. T-channels, threaded bolt holes, or other types of attachment points may be provided on some or all of the components of the side frame 102. The channels or other attachment points in the bottom rail 106, side rails 110, and top rails 112 may also be utilized to attach cargo and equipment to the utility rack 100.

In varying embodiments, the bottom rails 106, elbows 108, side rails 110, and top rails 112 may be formed from extrusions, or may be cast, machined, molded, cured, or otherwise manufactured according to methods known to those of skill in the art of manufacturing metal, plastic, or composite components. In some embodiments some of the components of the side assemblies 102 may be formed unitarily with other such components. For example, one of the elbows 108 may be formed unitarily from a single component or casting as an adjacent rail or formed by bending a portion of the rail extrusion. In the embodiment depicted in FIGS. 2A through 2E the bottom rail 106, side posts 110, and top rail 112 are extrusions, and the elbows 108a and 108b are cast components.

In a preferred embodiment of the utility rack 100, the bottom rails 106, elbows 108, side rails 110, and top rails 112 are connected to each other with flush joints. For the purposes of the claimed invention, the outer surfaces of the components are substantially flush if (i) the average outer surface elevations of the components forming the joint are offset at the joint by less than 10% of the width of the components, (ii) the surfaces adjacent to the joint are offset by more than 10% for less than half of the length of the joint around the surface of the component, or (iii) the non-flush joint or non-flush portion of a joint is on an inner surface of the utility rack (a surface facing into or toward the cargo bed of the truck) or a surface that is not completely visible from outside the cargo bed of the truck during normal use of the utility rack on the cargo bed. Substantially flush joints do not require seamlessness, and there may be chamfers, beads, manufacturing imperfections, or short sections of offset (such as the location of a t-channel on one side of the joint) and these do not prevent the joint from being substantially flush.

In some embodiments all or a portion of the outer surfaces of the rack 100 are continuous or substantially continuous across the joints between the components. "Substantial continuous" outer surfaces do not require seamless joints or a smooth outer surface over the entire surface of the rack 100 in all embodiments. In some embodiments the outer surface of the rack 100 is substantially continuous where the only breaks in the outer surface constitute t-channels, bolt holes, or other mechanisms for mounting brackets, plates, or cargo onto the rack 100. In other embodiments the outer surface of the rack 100 is continuous because the only breaks in the outer surface are facing toward the cargo bed of the truck 1, are in contact with the truck surface (such as the top of cargo bed side wall 2), are disposed on top surfaces of the top rail 112, elbows 108a, or crossbars 114, or are not visible to a person standing outside the cargo bed of the truck.

In some embodiments the side assemblies 102 comprise a closed loop structure. In a closed loop structure the ends of each component of the side frame/assemblies 102 mate to the ends of the adjacent component in the side frame 102 so that the side frame forms a loop without a protruding, unjoined end. In some embodiments of the closed-loop structure no internal gussets or supports are necessary for the rack 100 to support a desired load. In such embodiments the closed-loop structure is considered self-supporting. The closed loop structure provides aesthetic and functional benefits, such as allowing wide, unobstructed access openings through the center of the side frame 102 into the cargo bed of the truck. They also provide the ability to flexibly mount plates, racks, or other equipment onto the rack for carrying cargo.

In the embodiment depicted in FIGS. 2A through 2E the side assemblies 102 are connected by crossbar assemblies 114. In the first depicted configuration the ends of the crossbars 114 are attached to the top rails 112 by flush attachments so that the top surface of the crossbar 114 is substantially level with the top surface of the top rail 112. In some embodiments the crossbars 114 may be attached at any point along the top rail 112 by connection to a channel in the top rail 112, or the top rail 112 may be provided with multiple attachment points for the crossbar 114. A bracket and t-channel bolts or nuts may be utilized to provide the adjustable attachment.

In some embodiments the crossbars 114 may have an adjustable length to allow the use of the rack 100 on multiple truck bed widths. In some of these embodiments the crossbars 114 have two end sections for attachment to the top rails 112 and a sliding component that fits into a cavity inside the end sections, or vice versa. The sliding component may be fixed with respect to one of the end sections or may be slide with respect to both end sections. The top of the crossbar 114 may be provided with a channel for releasable attachment of cargo or equipment to the utility rack 100.

Figure 3A:
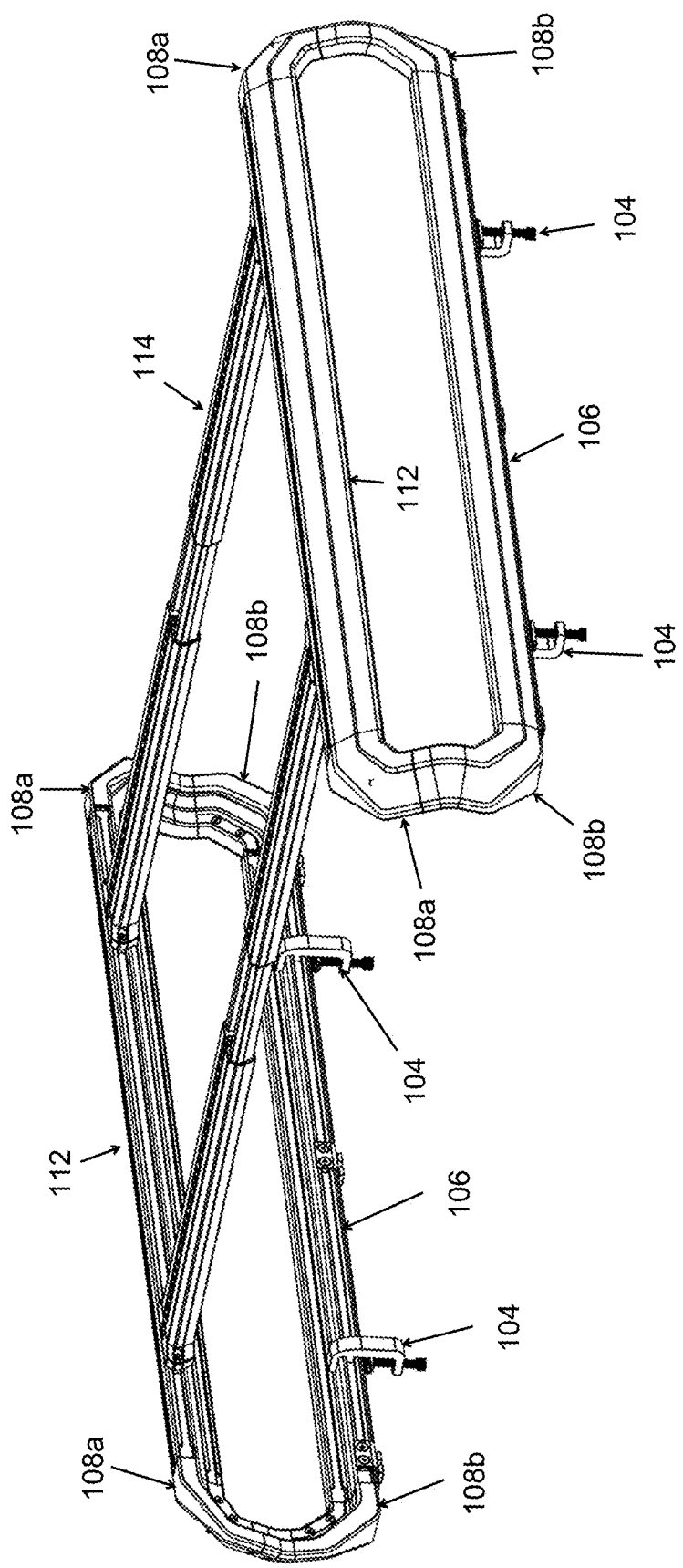
FIG. 3A is a perspective view of an embodiment of the utility rack in a second configuration.

FIGS. 3A through 3C depict a first embodiment of the inventive utility rack 100 in a second configuration. In this configuration the side rails 110 have been removed from the rack 100 and the top elbows 108a have been attached to the bottom elbows 108b. The elbows 108a and 108b are configured to connect with a substantially flush joint in a preferred embodiment. This configuration allows a user to reduce the height of the rack 100 as desired to fit onto a certain model truck or to adjust the height of the rack 100 as desired for a certain cargo or equipment attachment. For example, a roof tent may be mounted on the second configuration of the rack to bring it below the level of the truck cab rooftop for improved aerodynamics compared to an installation with the roof tent above the level of the truck cab roof.

Figure 4A:
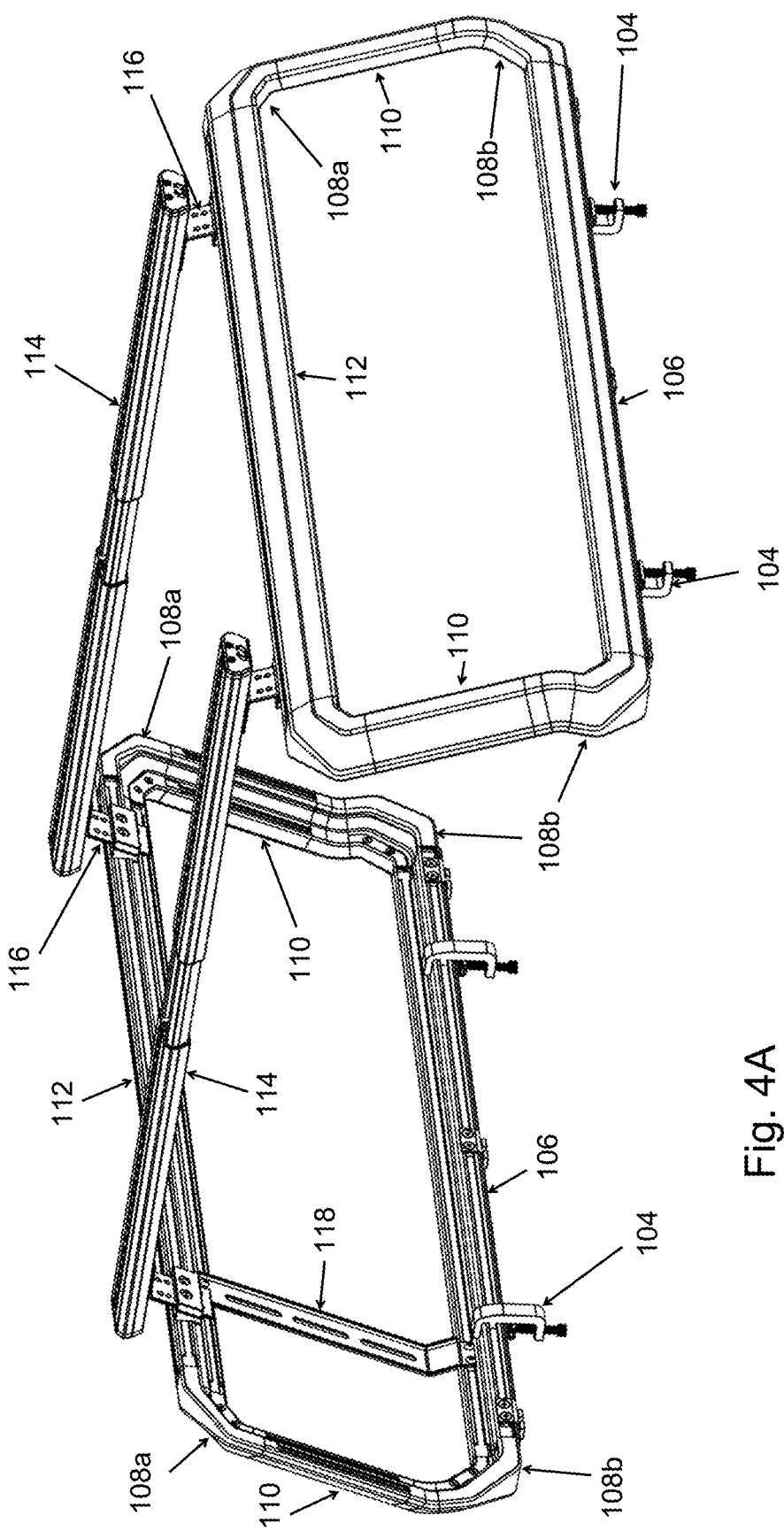
FIG. 4A is a perspective view of an embodiment of the utility rack in a third configuration.
Figure 4B:
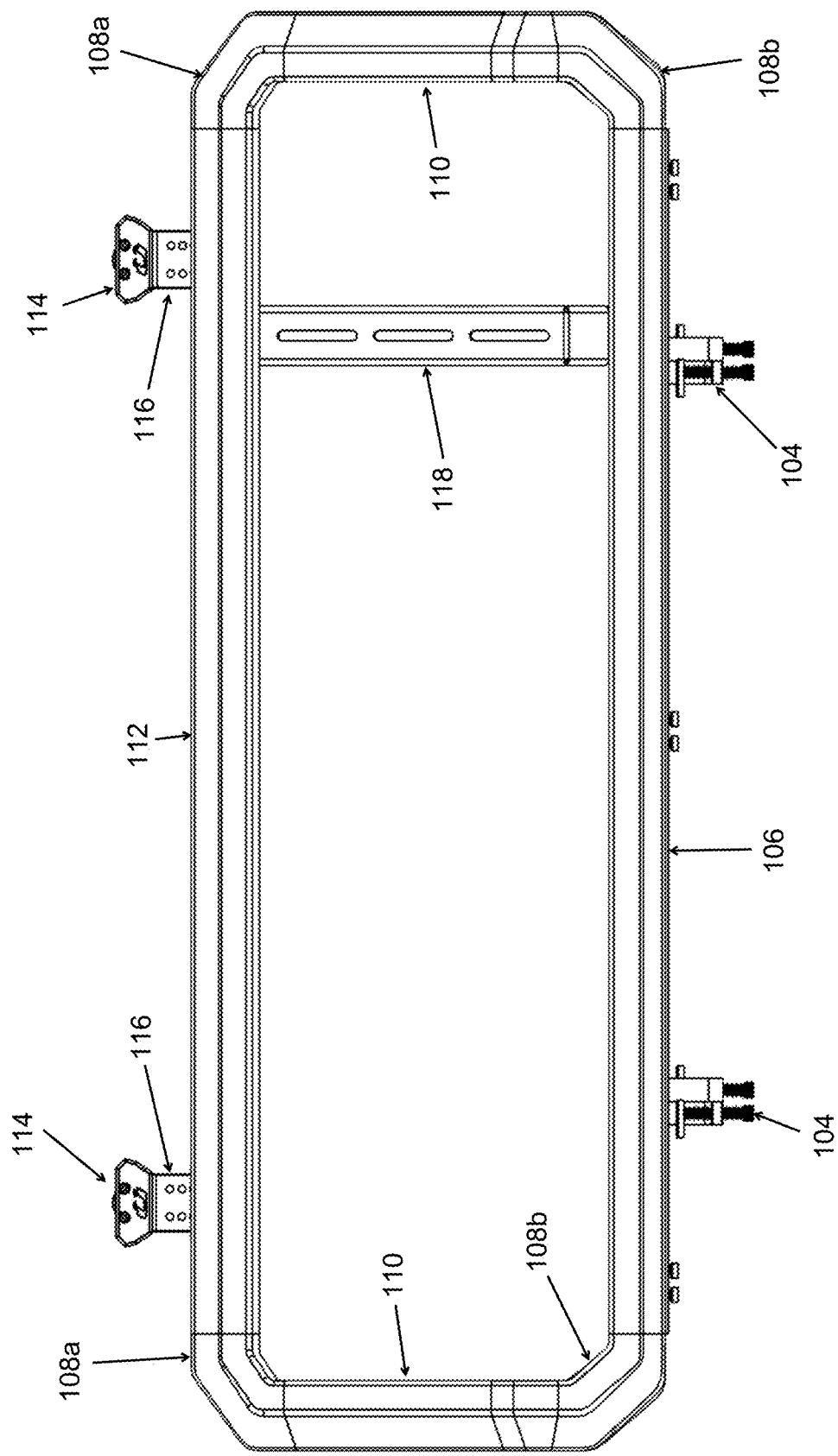
FIG. 4B is a side view of an embodiment of the utility rack in a third configuration.
Figure 4C:
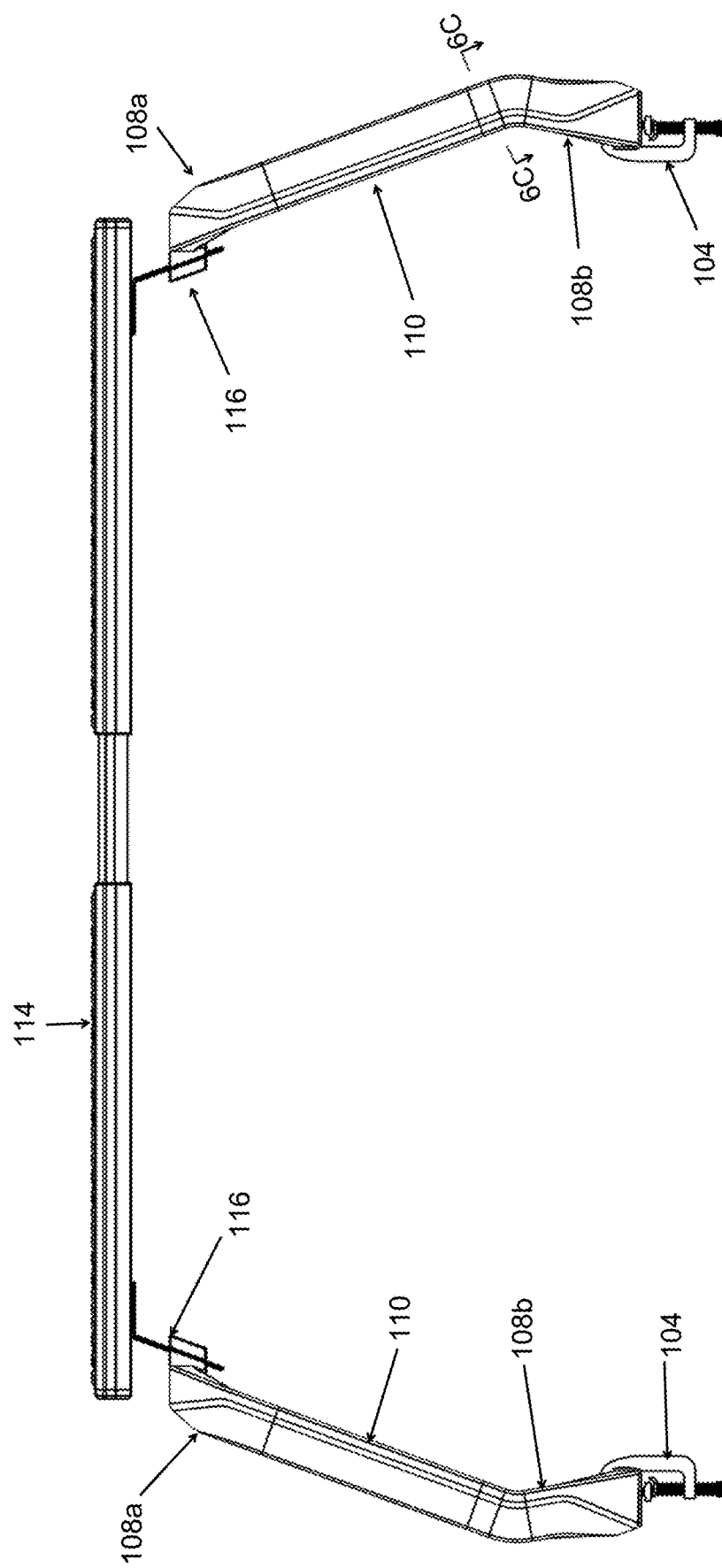
FIG. 4C is a front view of an embodiment of the utility rack in a third configuration

FIGS. 4A through 4C depict a first embodiment of the inventive utility rack in a third configuration. In this configuration the crossbars 114 are attached to the top rails 112 by adjustable brackets 116. These brackets allow the crossbars 114 to be raised or lowered to a desired position above the top rails 112 of the rack 100. This allows the height of the crossbars 114 to be adjusted to match the roof or roof top rails on the cab of a truck, or to extend the crossbars 114 to a wider dimension as needed to carry wider cargo or equipment on the crossbars 114.

This configuration is also depicted with an optional attachment component 118 that is attached to the bottom rail 106 and top rail 112. The component 118 may be provided with holes, slots, or other mounting devices to allow a user to attach cargo, equipment, or other racks to the rack 100. Multiple components 118 may be used on the same side assembly to support long items or multiple items simultaneously. The components 118 may be attached to channels or features on the rails 106 and 112 to allow them to translate along and be fixed at any point thereon, or there may be discrete mounting points on the rails. Component 118 is not structural with respect to the side frame 102, but only provides support to items mounted on side frame 102.

Figure 5A:
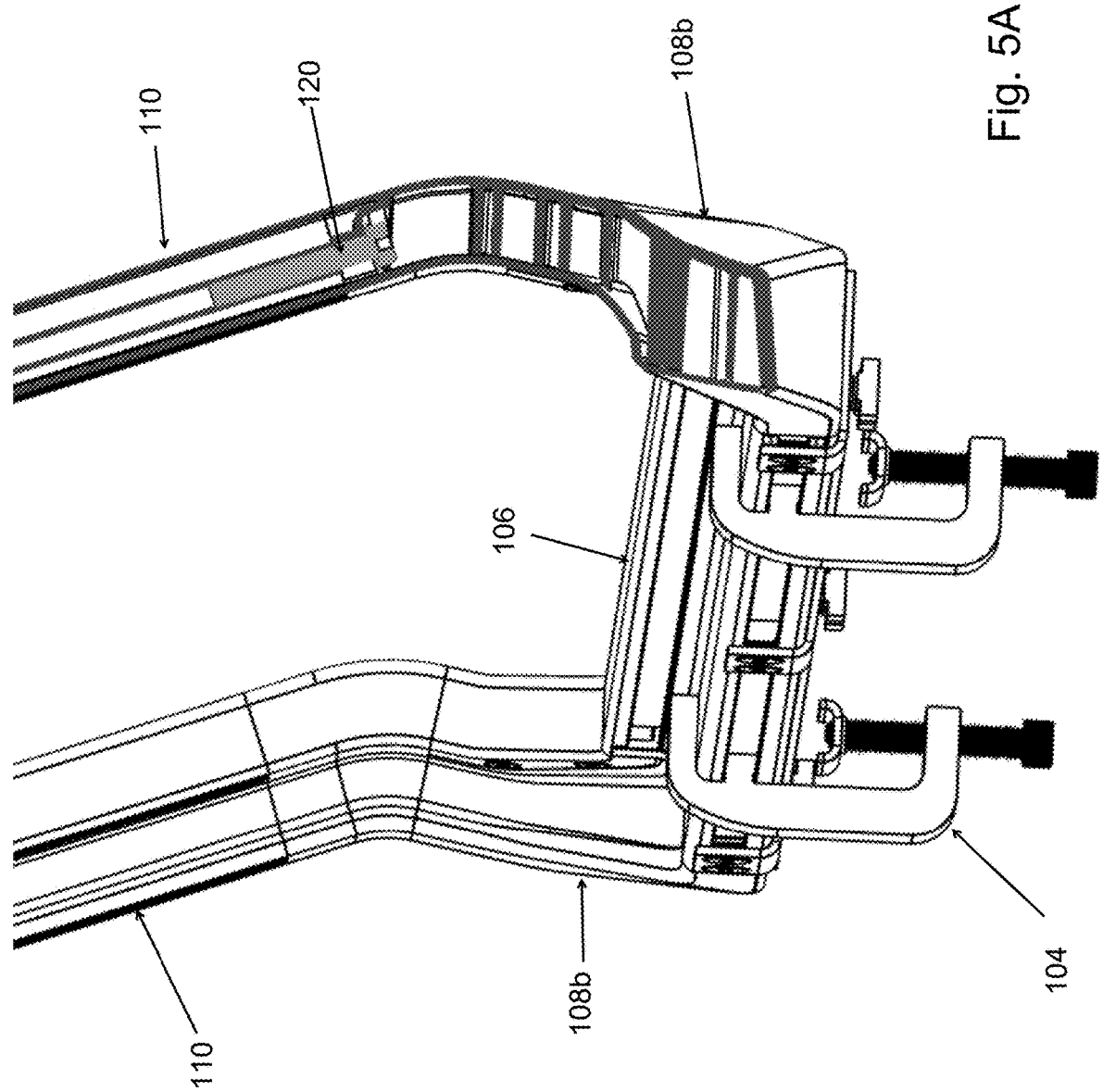
FIG. 5A is a cross-sectional view of the joint between two components of an embodiment of the utility rack.
Figure 5C:
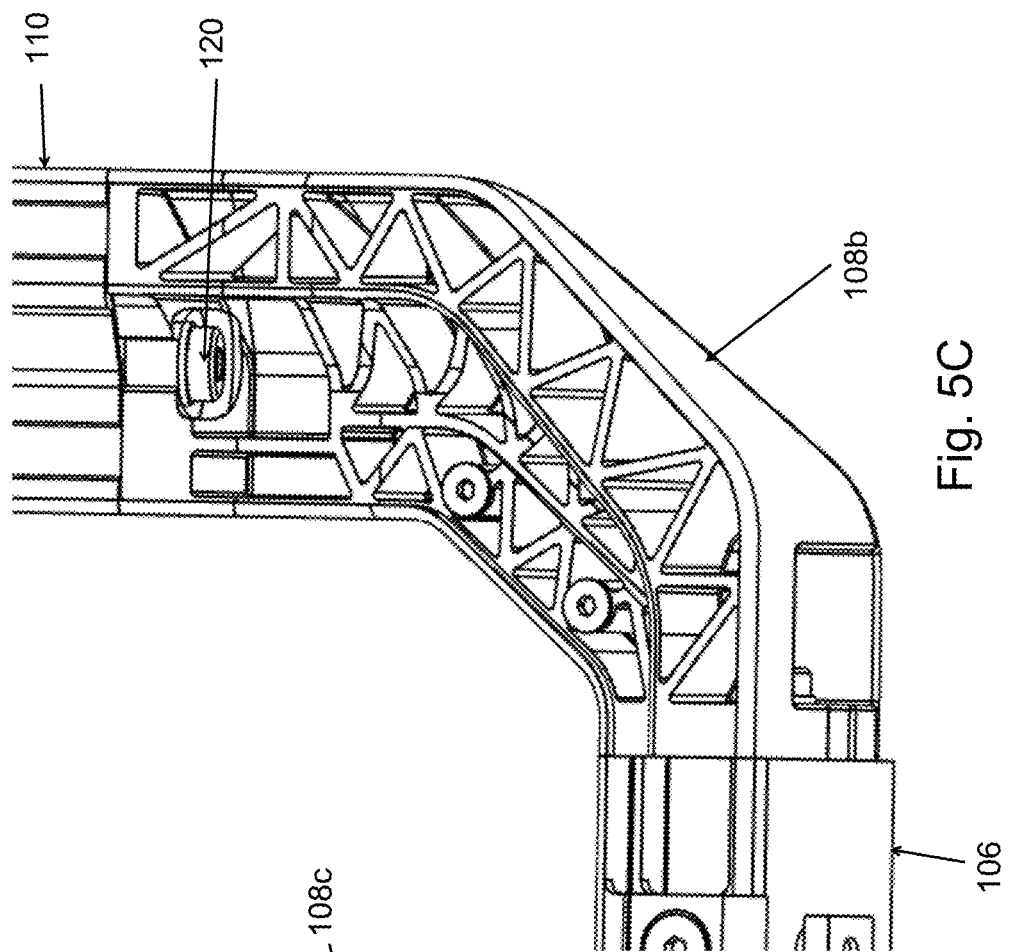
FIG. 5C is a side view of a joint between two components of an embodiment of the utility rack with an access panel removed.
Figure 5B:
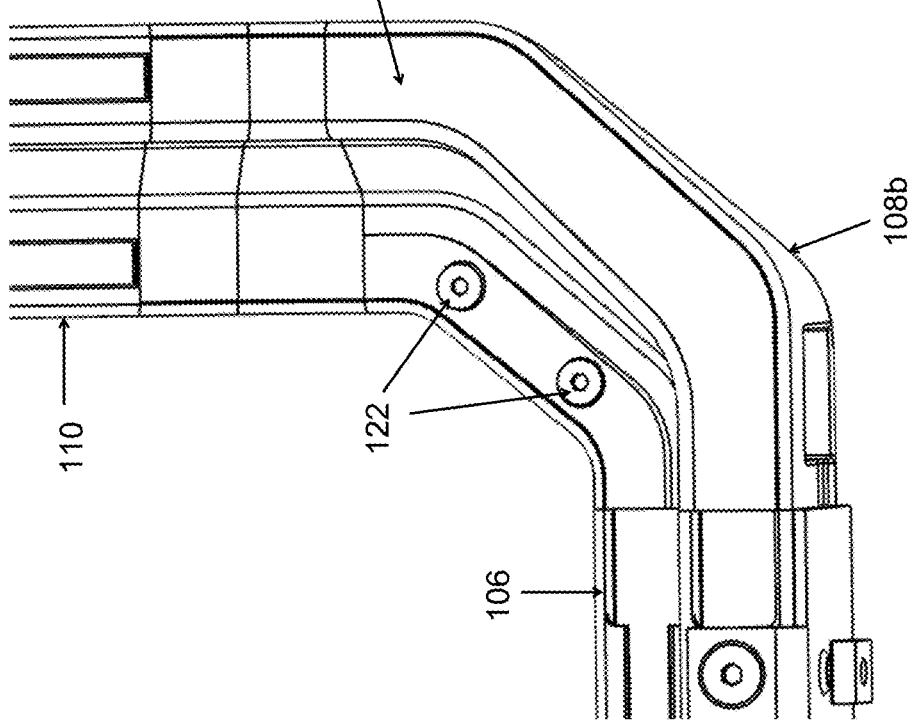
FIG. 5B is a side view of a joint between two components of an embodiment of the utility rack.

In some embodiments the inventive utility rack 100 is provided with an internal attachment mechanism utilized to attach the components of the side assemblies 102 to each other. FIGS. 5A through 5D depict an embodiment of such an internal attachment mechanism. In the depicted embodiment a single bolt is utilized to attach each pair of components. FIG. 5A depicts a cross-sectional view through a joint between a lower elbow 108b and a side rail 110 on plane 5A shown in FIG. 2D. A bolt 120 is secured in a cavity in elbow 108*b* and extends through an aperture in the elbow's upper surface into a threaded aperture inside rail 110 to secure the two components together. One embodiment of the access to the bolt 120 is depicted in FIGS. 5B and 5C which depict side views of an inside surface of elbow 108*b*. In this context "inside surface" means the side of the component closest to the bed of the truck and farthest from the outside surface of the truck to which the rack is attached. In FIG. 5B an access panel 108*c* is attached to elbow 108*b* by one or more screws 122, and optionally by edge features that may interlock with the elbow 108*b*. Another bolt 120, not depicted in FIGS. 4B and 4C, may be disposed through the other end of elbow 108*b* into the bottom rail 106 to secure the elbow 108*b* to that rail as well.

Figure 5D:
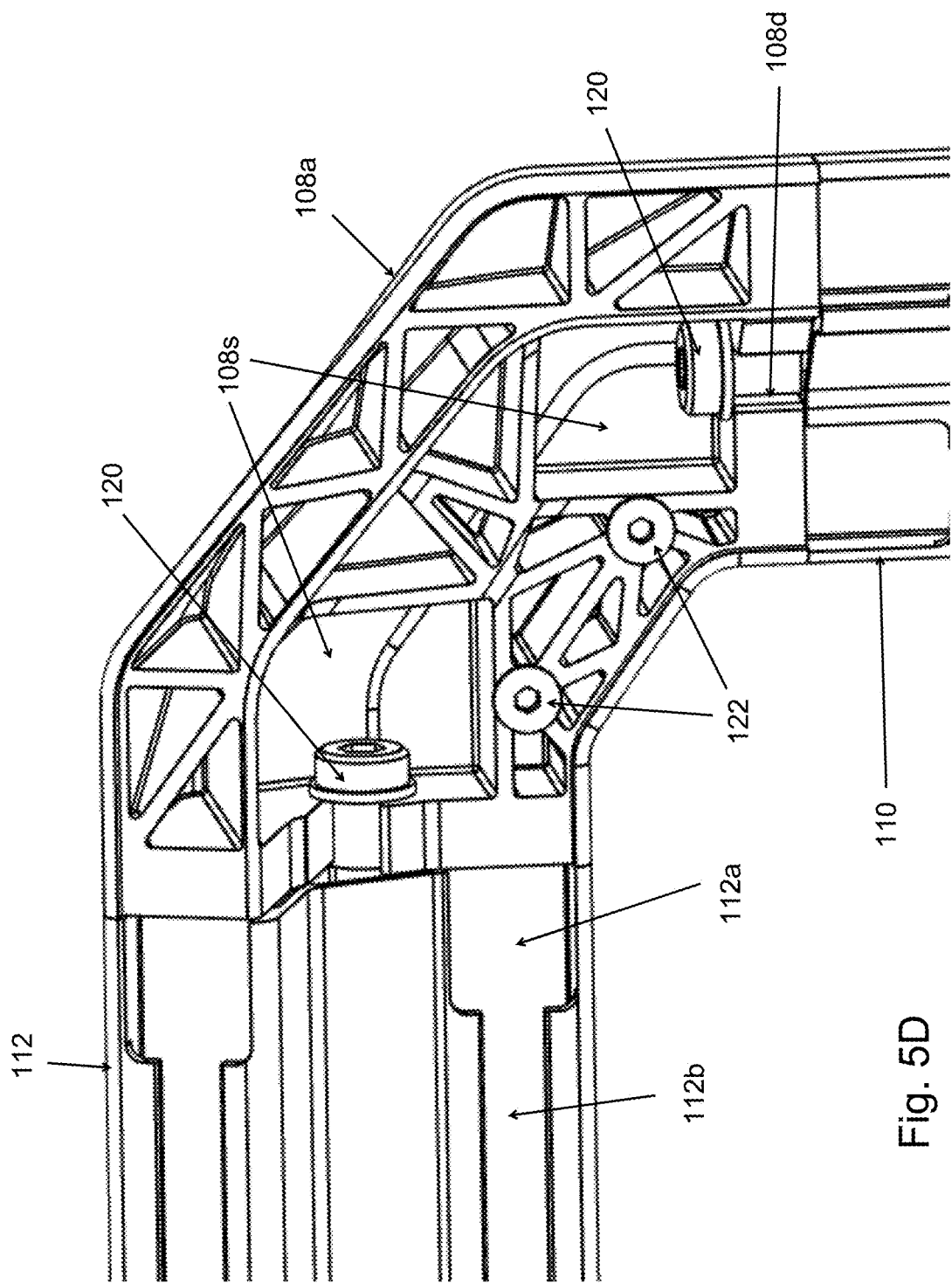
FIG. 5D is a side view of a joint between three components of an embodiment of the utility rack with an access panel removed.

FIG. 5D depicts an upper elbow 108*a* with the access panel 108*c* removed to reveal two bolts 120 disposed in apertures 108*d* in the ends of elbow 108*a* and securing it to side rail 110 and top rail 112. In some embodiments the aperture 108*d* in elbow 108(*a* or *b*) for the bolt 120 may be provided with a slot to allow the elbow 108 to be slotted or slid over a bolt 120 that is already partially threaded into an aperture in one of the rails 106, 110, or 112. Securing access panel 108*c* over the inside surface of elbow 108*a* and securing it in place with one or more screws completes a substantially flush joint between the elbow 108*a* and side and top rails 110 and 112 respectively. In some embodiments apertures 112*a* may be provided near or at the joint to allow access to a channel such as t-channel 112*b* without removing the elbow 108. These apertures may be provided near each joint or at various places on the channels on the bottom, side, and top rails.

Figure 6A:
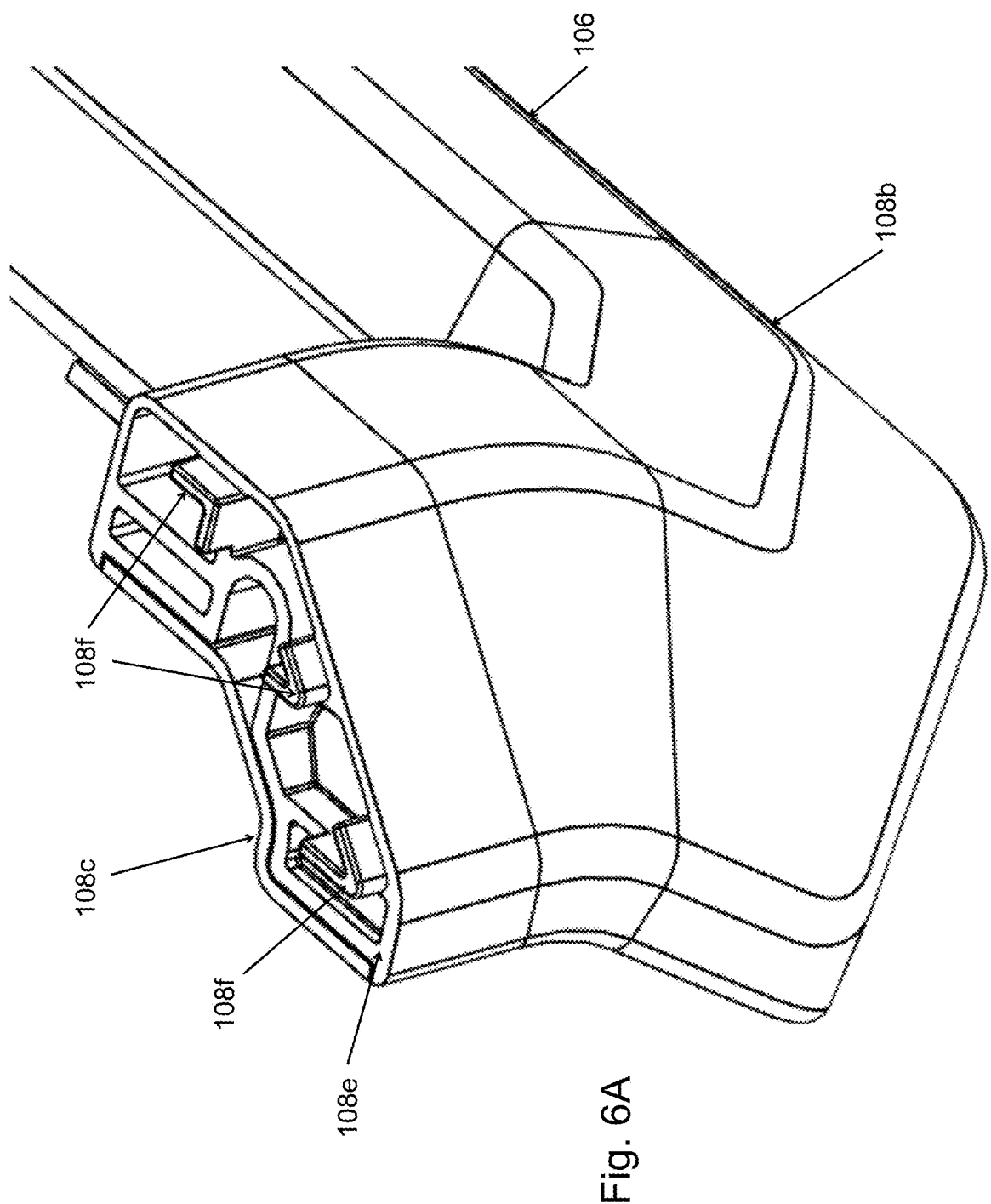
FIG. 6A is a perspective view of a partially disassembled portion of an embodiment of the utility rack.

In some embodiments the elbows, posts, and rails may be provided with protrusions, indentations, or other features on their joint-facing surfaces to improve alignment and prevent incorrect assembly of the rack 100. One embodiment of these features is depicted in FIGS. 6A through 6C. FIG. 6A depicts the upper joint-facing surface 108*e* of the lower elbow 108*b* with the side rail 110 removed. Panel or cover 108*c* is attached to the inside surface of the elbow 108*b*. In this embodiment three features 108*f* extend upwardly from the surface 108*e*. Several cavities are also visibly indenting into the surface 108*e* as well.

FIG. 6B depicts the lower joint-facing surface 108*g* of the upper elbow 108*a*, with threaded bolt 120 extending downwardly through it through aperture 108*d*. In this embodiment a different, complementary set of features 108*h* extends downwardly from surface 108*g*. In this embodiment when the joint surfaces 108*g* and 108*e* of elbow 108*a* and 108*b*, respectively, are placed in contact with the joint surfaces or ends of a side rail 110, the features 108*f* will extend upwardly into cavities in the lower joint-facing surface or end of side rail 110, and the features 108*h* will extend downwardly into cavities in the upper joint-facing surface or end of the side rail 110. The features in this embodiment are different so the cavities in the side rail 110 may be provided to prevent incorrect assembly of the joints. These features also allow the top elbow 108*a* to be attached directly to elbow 108*b* without side rail 110 as shown in FIGS. 3A through 3C. In other embodiments the elbows may be identical with the same features on each joint facing surface.

In the embodiments with different but complementary surfaces 108*f* and 108*h*, the two elbows may be joined to comprise the second configuration of the rack 100 depicted in earlier FIGS. 3A through 3C in this application. A cross-sectional view of such an embodiment is depicted in FIG. 6C showing a cross-section of a joint between an upper elbow 108*a* and lower elbow 108*b*. This view depicts the interlocking and complementary features 108*f* and 108*h* and the cavities in the two elbow components. The plane of cross-section for FIG. 6C is shown in FIG. 4C.

Figure 7A:
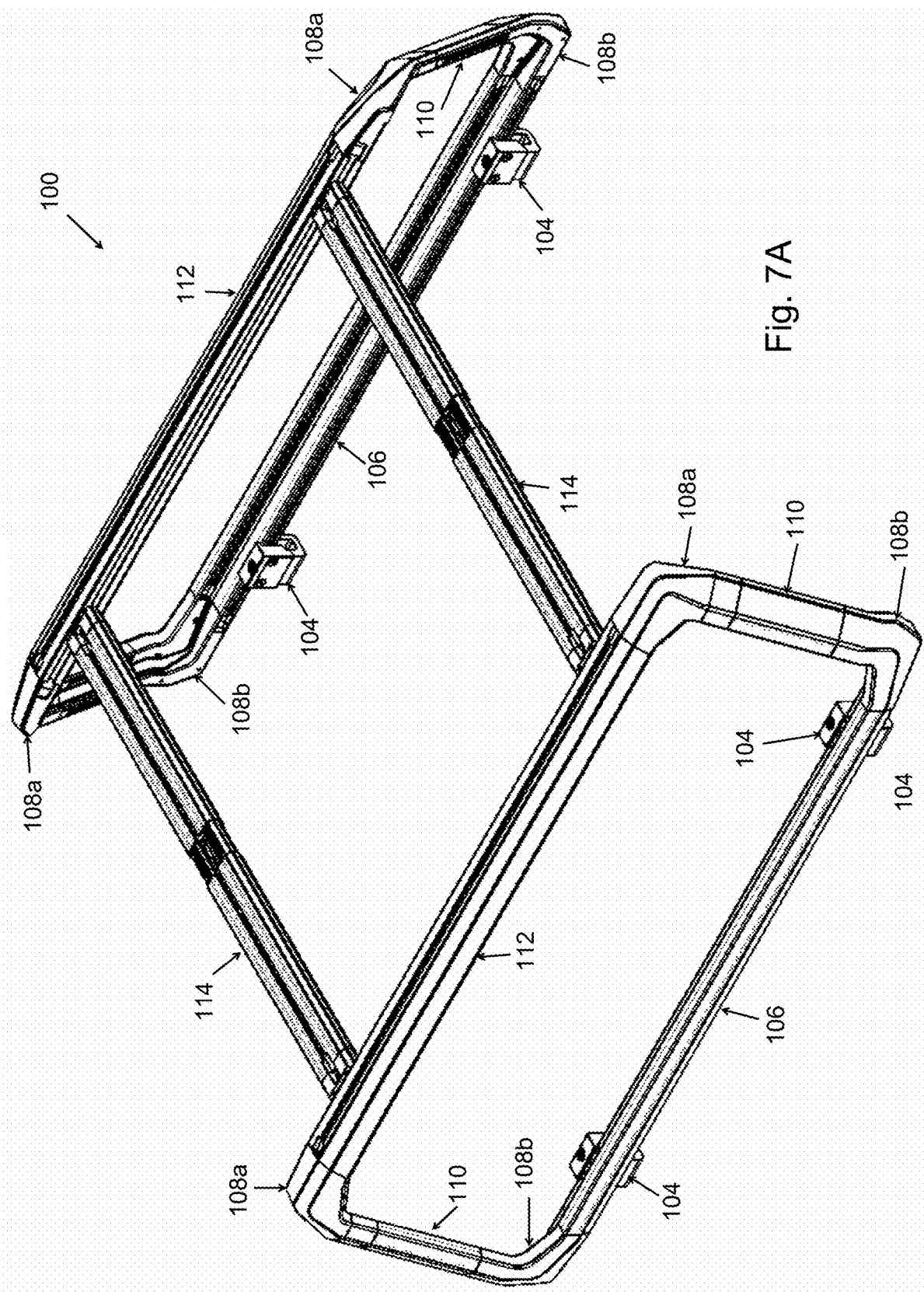
FIG. 7A is a perspective view of a third embodiment of the utility rack.
Figure 7B:
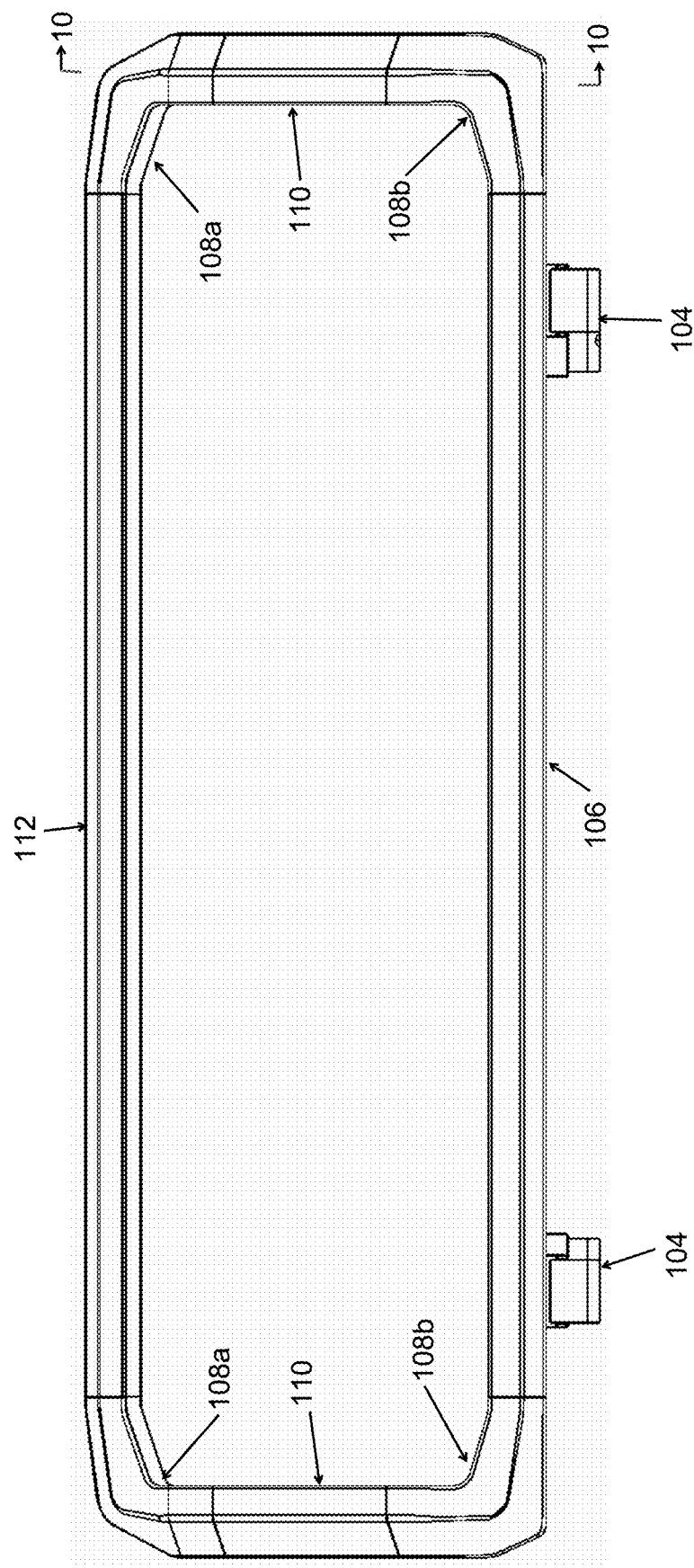
FIG. 7B is a side view of an additional embodiment of the utility rack.
Figure 7C:
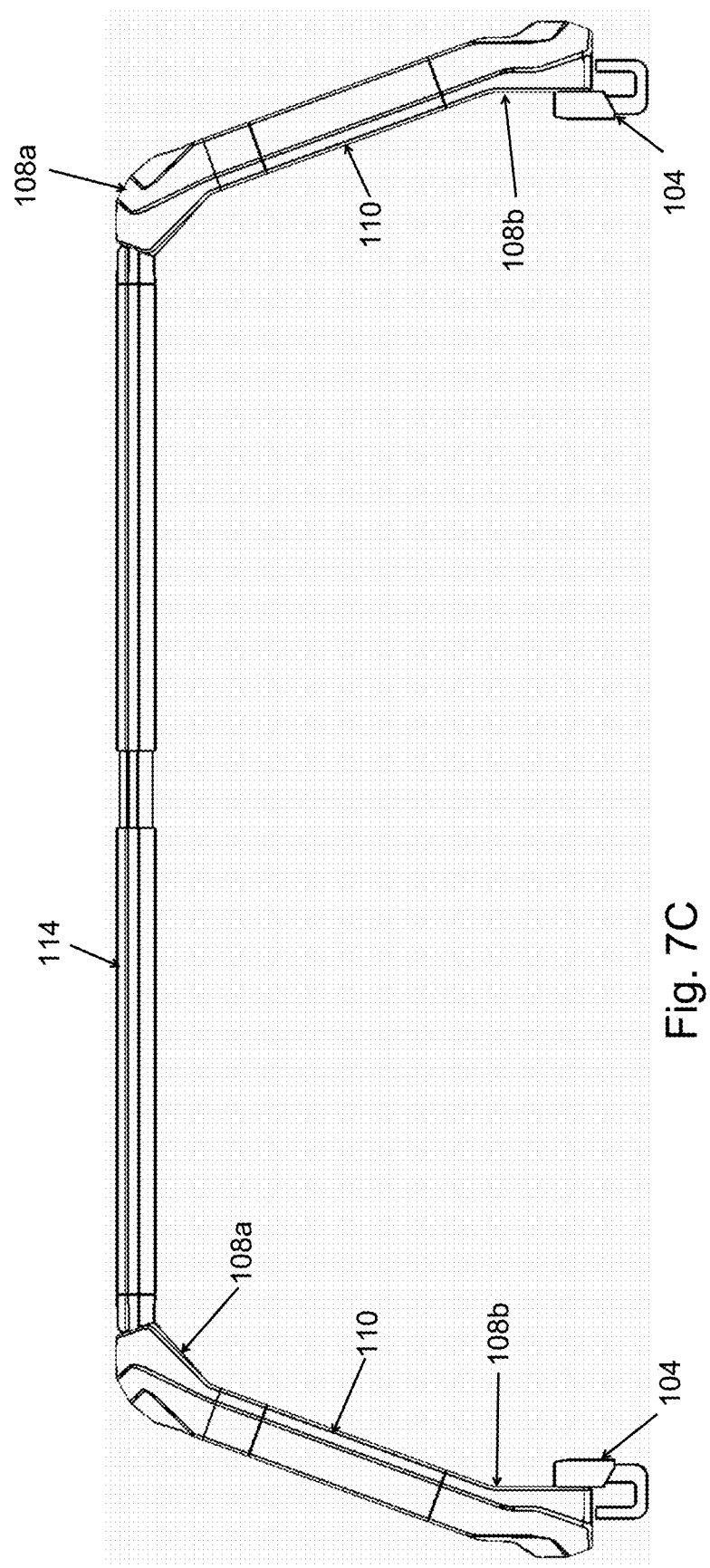
FIG. 7C is an end view of an additional embodiment of the utility rack.

Referring to FIGS. 7A through 10C an additional embodiment of the utility rack 100 is depicted. FIGS. 7A through 7C show perspective, side, and end views of the embodiment, with numbering similar to that for the first embodiment. FIG. 7D depicts an upper elbow 108*a* with access panel 108*c* removed. This embodiment has two fasteners 120, in this case threaded bolts, securing the elbow 108*a* to the top rail 112, and two more fasteners 120 attaching it to side post 110. The fasteners 120 are disposed in one or more internal cavities in the elbow 108*a* so that once the cover 108*c* is attached to the elbow 108*a* the fasteners 120 are not visible. Similarly, a lower elbow 108*b* is depicted in FIG. 7E with the access panel or cover 108*c* removed. As can be seen in these figures, the cavities have cutouts or holes in the baffles to permit tools to access the heads of fasteners 120 so that they may be tightened or loosened a needed. The internal ends of screws 122 will thread into holes in the access cover panel 108*c* to hold it in place.

FIG. 7F depicts the access panel in relation to the elbow 108*b*. In this embodiment the cover panel 108*c* is disposed on the outer surface of the utility rack 100. In this embodiment screws 122 are provided on the inside surface (toward the cargo bed) of the elbow 108*b* to hold the access cover 108*c* in place without externally visible fasteners.

Figure 8B:
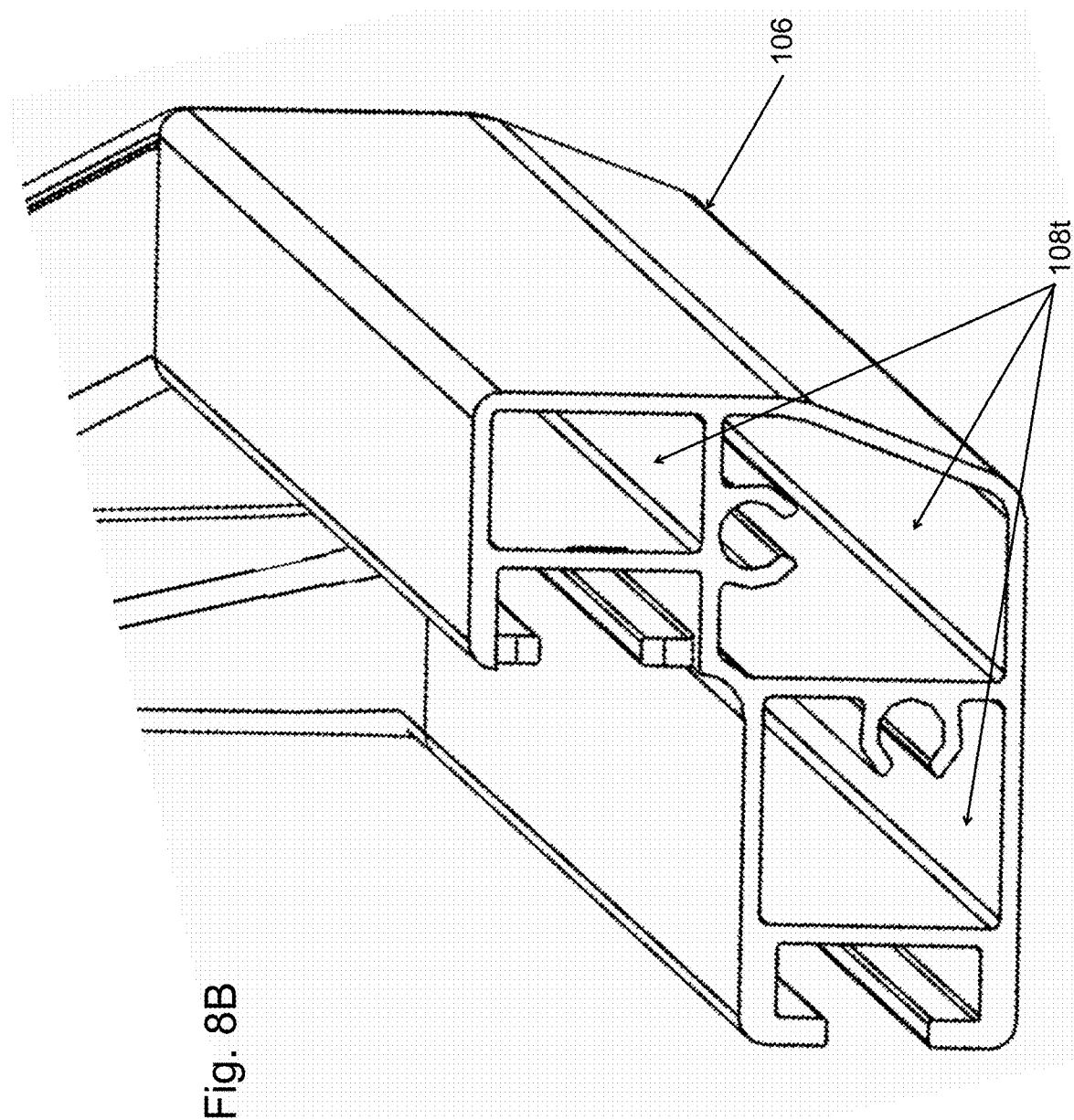
FIG. 8B is a detail, perspective view of a portion of an additional embodiment of the utility rack.

FIGS. 8A through 10C depict the protrusions on the elbows 108*a* and 108*b* for aligning and securing the components of the side assembly 102. FIG. 8A depicts protrusions 108*f* extending from one end of the elbow 108*b* as seen when bottom rail 106 is removed. These protrusions fit into the cavities 108*t* in bottom rail 106 shown in FIG. 8B where elbow 108*b* has been removed. Similar protrusions fit into cavities in the extrusion for top rail 112 as well. FIG. 8B also depicts the threaded apertures in rail 106 for receiving the threaded fasteners 120. In this embodiment they are partial cylinders formed as part of the extrusion of rail 106.

Figure 10B:
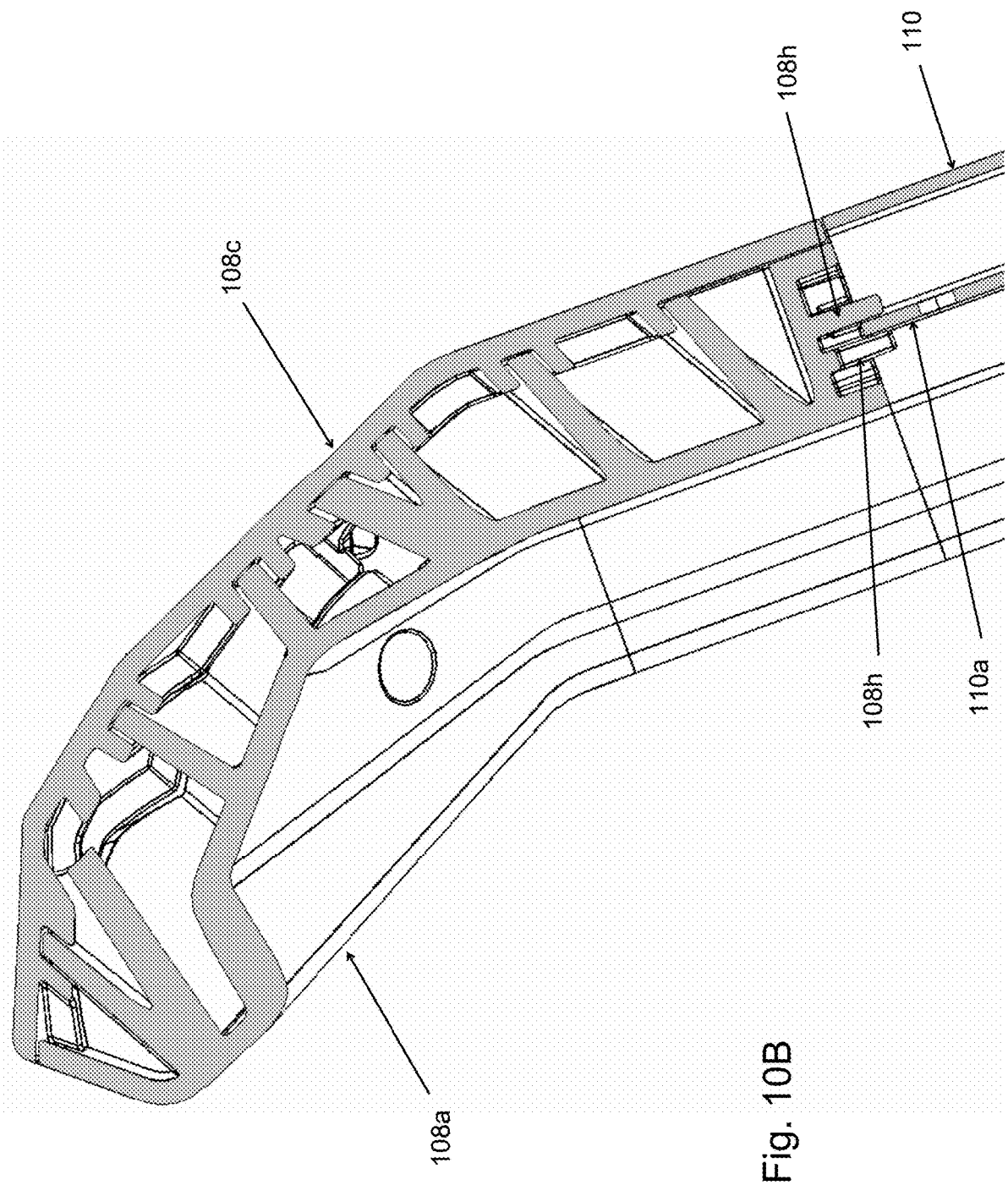
FIG. 10B is a cross-sectional view of a portion of an additional embodiment of the utility rack.

FIGS. 9A and 9B depict the protrusions on the ends of elbow 108 that interlock with side posts 110. The apertures through the elbows for fasteners 120 are also visible. FIGS. 10A and 10B are partial cross-sections on plane 10 shown on FIG. 7B. FIG. 10A depicts a cross-section of the lower elbow 108*b* connected to the side post 110. In the cross-section the interlocking of protrusions 108*f* with at least one wall 110*a* of the side post 110. This interlocking of protrusions on opposing sides of the wall 110*a* prevents the movement of the two parts laterally or rotationally with respect to each other. In other embodiments the interlocking may consist of a single protrusion that interlocks with two or more walls 110*a* of the side post 110, or a protrusion 108*f* that fills a cavity within side post 110. In some embodiments the protrusions may be on the side post 110 and the cavities or inner walls that interlock with them are on the elbow 108*a* or 108*b*. As can be seen in FIGS. 9A and 9B, in this embodiment one of the protrusions is disposed at an angle to the others so that laterally movement of the parts will be prevented in the plane of the joint. FIG. 10B depicts the same interlocking at the joint between upper elbow 108*a* and side post 110.

Figure 10C:
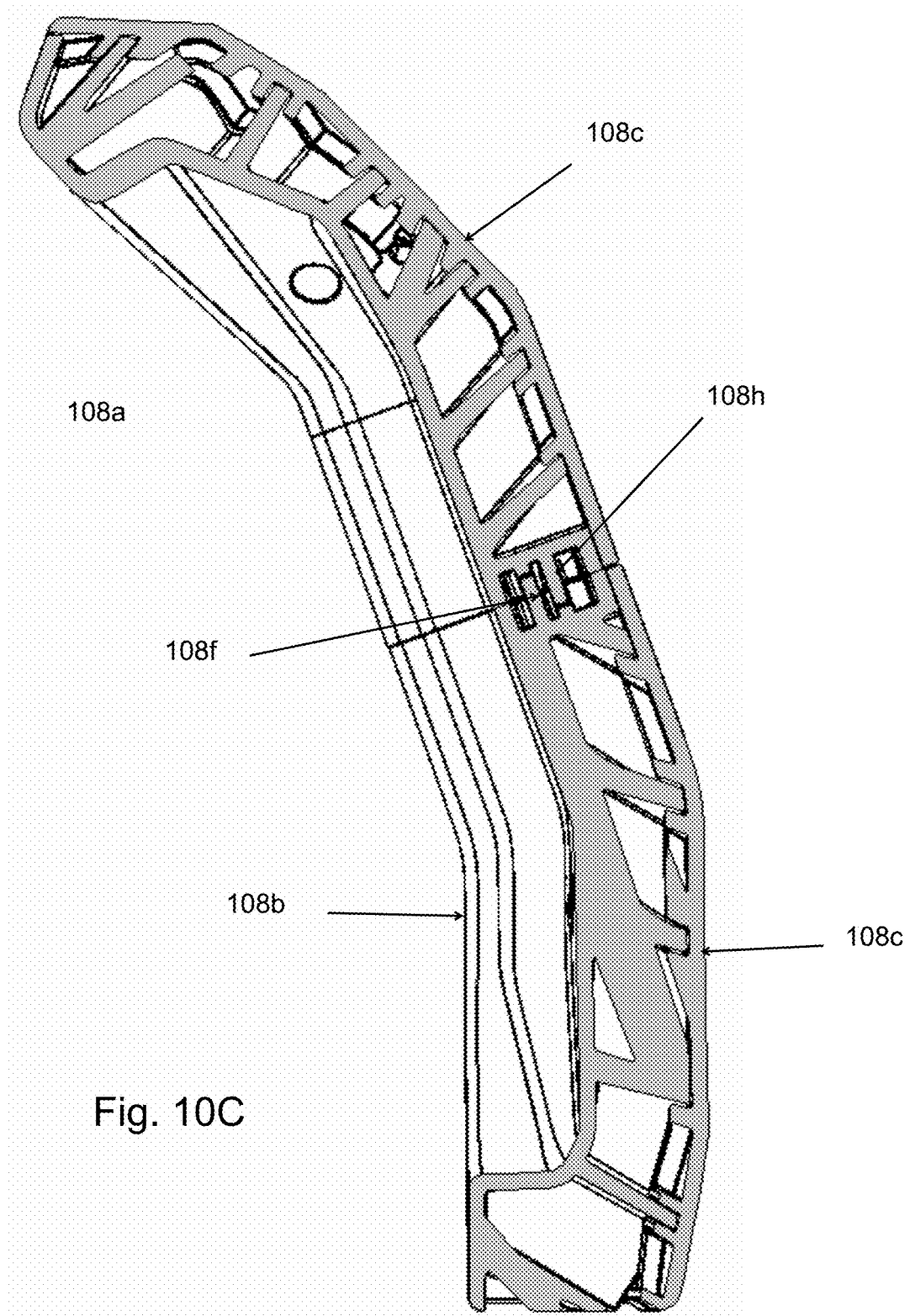
FIG. 10C is a cross-sectional view of a portion of an additional embodiment of the utility rack.

FIG. 10C depicts cross-section is on plane 10C depicted in FIG. 3B. It shows the ability of this embodiment to interlock between the top elbow 108*a* and lower elbow 108*b* to form a shorter configuration of the utility rack 100 such as that depicted in FIGS. 3A through 3C. This allows the side post 110 to be removed from the rack 100 and the elbows connected directly to each other by fasteners 120.

The following item lists A, B, and C are illustrative, but not limiting, of embodiments of the inventive utility rack. Features of the following item lists may constitute features of the other item lists. The reference numbers provided in the item descriptions are for ease of reference to the figures and shall not be construed as limiting their subject matter.

A1. A utility rack (100) for a truck having a cargo bed, the utility rack (100) having two side frame assemblies (102), wherein each side frame assembly (102) is a closed loop structure.

A2. The utility rack (100) according to A1, further including at least one extendable cross bar (114).

A3. The utility rack (100) according to A1, wherein each side frame assembly (102) is self-supporting.

A4. The utility rack (100) according to any of the preceding A items, wherein each side frame assembly (102) comprises a lower rail (106), first and second lower elbows (108b), first and second side posts (110), first and second upper elbows (108a), and an upper rail (112).

A5. The utility rack (100) according to any of the preceding A items, wherein the outer surface of the side frame assemblies (102) is continuous.

A6. The utility rack (100) according to any of the preceding A items, wherein the joints between the components forming side assemblies (102) are substantially flush joints.

A7. The utility rack (100) according to any of the preceding A items, wherein the components forming the side assemblies (102) are attached together by internal fasteners (120).

A8. The utility rack (100) according to any of the preceding A items, wherein the upper elbows (108a) are provided with protrusions from an end thereof to interlock with cavities in an upper end of the side posts (110).

A9. The utility rack (100) according to any of the preceding A items, wherein the lower elbows (108b) are provided with protrusions from an end thereof to interlock with cavities in a lower end of the side posts (110).

A10. The utility rack (100) according to any of the preceding A items, wherein the protrusions of the upper elbow (108a) are configured to interlock with cavities in the lower elbow (108b).

A11. The utility rack (100) according to any of the preceding A items, wherein the protrusions of the lower elbow (108b) are configured to interlock with cavities in the upper elbow (108a).

A12. The utility rack (100) according to any of the preceding A items, wherein the interlocking protrusions reduce lateral or rotational movement of the upper elbow (108a), the side post (110), and the lower elbow (108b) with respect to each other.

A13. The utility rack (100) according to any of the preceding A items, wherein the fasteners (120) between the components of the side frame assemblies (102) are disposed in cavities in the elbows (108a and 108B).

A14. The utility rack (100) according to any of the preceding A items, wherein the fasteners (120) extend through apertures (108d) in the elbows and into sockets in the adjacent component of the side frame assemblies (102).

A15. The utility rack (100) according to any of the preceding A items, wherein t-channels are provided on the bottom rail (106), the top rail (112), or the side posts (110) for attachment of cargo to the rack (100).

A16. The utility rack (100) according to any of items A13 through A15, wherein each elbow (108a or 108b) is provided with an access panel to cover the internal cavity thereof.

A17. The utility rack (100) according to any of items A13 through A16, wherein the fasteners (120) are threaded bolts with their head disposed in the internal cavity of the elbows (108a or 108b).

A18. The utility rack (100) according to any of the preceding A items, wherein substantially all of the bottom surface of the lower rail (106) is configured to contact the top surface of the side wall of a truck cargo bed.

A19. The utility rack (100) according to any of the preceding A items, wherein the lower elbows (108b) include protrusions configured to insert into the cavities in the lower rail (106).

A20. The utility rack (100) according to any of the preceding A items, wherein the upper elbows (108a) include protrusions configured to insert into the cavities in the upper rail (112).

B1. A utility rack (100) for a truck having a cargo bed, the utility rack (100) having two side frame assemblies (102) with removable side posts (110) in a first configuration (FIG. 2A), wherein when the side posts (110) are removed from the side frame assemblies (102) the utility rack (100) is in a second configuration (FIG. 3A).

B2. The utility rack (100) according to B1, wherein the upper ends of the removable side posts (110) are configured to attach to the upper elbows (108a) of side frame assemblies (102), and the lower ends of the removable side posts (110) are configured to attach to the lower elbows (108b) of side frame assemblies (102).

B3. The utility rack (100) according to any of the preceding B items, wherein the upper elbows (108a) are configured to attach to the lower elbows (108b) when the removable side posts (110) are removed from the rack (100).

B4. The utility rack (100) according to any of the preceding B items, wherein the upper elbows (108a) are provided with protrusions from an end thereof to interlock with cavities in an upper end of the side posts (110).

B5. The utility rack (100) according to any of the preceding B items, wherein the lower elbows (108b) are provided with protrusions from an end thereof to interlock with cavities in a lower end of the side posts (110).

B6. The utility rack (100) according to any of the preceding B items, wherein the protrusions of the upper elbow (108a) are configured to interlock with cavities in the lower elbow (108b).

B7. The utility rack (100) according to any of the preceding B items, wherein the protrusions of the lower elbow (108b) are configured to interlock with cavities in the upper elbow (108a).

B8. The utility rack (100) according to any of the preceding B items, wherein the interlocking protrusions reduce lateral or rotational movement of the upper elbow (108a), the side post (110), and the lower elbow (108b) with respect to each other.

B9. The utility rack (100) according to any of the preceding B items, wherein substantially all of the bottom surface of the lower rail (106) is configured to contact the top surface of the side wall of a truck cargo bed.

B10. The utility rack (100) according to any of the preceding B items, wherein the lower elbows (108b) include protrusions configured to insert into the cavities in the lower rail (106).

B11. The utility rack (100) according to any of the preceding B items, wherein the upper elbows (108a) include protrusions configured to insert into the cavities in the upper rail (112).

B12. The utility rack (100) according to any of the preceding B items, wherein the components forming the side assemblies (102) are attached together by internal fasteners (120).

B13. The utility rack (100) according to any of the preceding B items, wherein the joints between the components forming side assemblies (102) are substantially flush joints.

B14. The utility rack (100) according to any of the preceding B items, wherein each side frame assembly (102) is a closed loop structure.

B15. The utility rack (100) according to any of the preceding B items, wherein each side frame assembly (102) is self-supporting.

C1. The utility rack (100) having a side frame assembly (102) of components without an exposed end face (108e, 108g).

C2. The utility rack (100) according to C1, wherein end face (108e, 108g) of a component is mated to an end face of another component.

C3. The utility rack (100) according to any of the preceding C items, wherein the surface of the side frame assembly (102) other than the end faces (108e, 108g) comprises the outer surface of the side frame assembly (102), and the outer surface is substantially continuous.

C4. The utility rack (100) according to any of the preceding C items, wherein the outer surface of the side frame (102) is continuous.

C5. The utility rack (100) according to any of the preceding C items, wherein the joints between the components of the side frame (102) are substantially flush joints.

C6. The utility rack (100) according to any of the preceding C items, wherein the joints between the components of the side frame (102) are flush joints.

C7. The utility rack (100) according to any of the preceding C items, wherein the outer surface of the side frame (102) facing away from the cargo bed of the truck is a continuous surface.

C8. The utility rack (100) according to any of the preceding C items, wherein the outer surface of the side frame (102) facing away from the cargo bed of the truck is a substantially continuous surface.

C9. The utility rack (100) according to any of the preceding C items, wherein each side frame assembly (102) is a closed loop structure.

C10. The utility rack (100) according to any of the preceding C items, wherein each side frame assembly (102) is self-supporting.

"Substantially", "approximately", or "about" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder. "Substantially all" of a distance, component, or other measure means at least half of the distance, component, or measure.

"Comprising," "including," and "having" (and conjugations thereof) are used interchangeably to mean including but not necessarily limited to, and are open-ended terms not intended to exclude additional, unrecited elements or method steps.

Changes may be made in the above methods, devices and structures without departing from the scope hereof. Many different arrangements of the various components depicted, as well as components not shown, are possible without departing from the spirit and scope of the present invention.

Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A utility rack for a truck having a cargo bed with opposing side walls, the utility rack comprising:
    a top member, a bottom member, and two side members connected at their respective ends to form the outer boundary of a continuous side frame forming a first closed loop side assembly;
    a top member, a bottom member, and two side members connected at their respective ends to form the outer boundary of a continuous side frame forming a second closed loop side assembly;
    wherein each of a plurality of joints between the members in the side assemblies are substantially flush joints without external fasteners; and
    wherein the bottom members of the first and second side assemblies are configured to clamp to the opposing side walls of the cargo bed; and
    wherein a crossbar spanning the cargo bed is attached to the top members of the first and second side assemblies; and
    wherein the crossbar is spaced-apart from the ends of the top members; and
    wherein each joint in the plurality of joints connects to exactly two members.

2. The utility rack of claim 1, wherein each of the plurality of joints comprises an elbow connecting an end of a top or bottom member to an end of one of the side members;
    wherein each elbow further comprises an internal cavity for receiving a fastener, and an aperture from the internal cavity to an outer surface of the elbow for connecting the fastener to one of the members.

3. The utility rack of claim 2, wherein each elbow further comprises a second aperture for a second fastener for connecting the elbow to another of the members.

4. The utility rack of claim 2, wherein the elbows further comprise one or more protrusions extending from the outer surface of the elbow into one or more sockets in the end of the adjacent member.

5. The utility rack of claim 4, wherein the protrusions are configured to prevent rotation of the elbow and the member at the joint with respect to each other.

6. The utility rack of claim 5, wherein each of the plurality of elbows comprises a unitary component, and wherein the aperture extends from the cavity to a portion of the outer surface of the elbow where the protrusions are disposed, the portion being configured to mate to an end of one of the members; and
    wherein the end of the member further comprises a cavity for receiving the fastener to secure the joint.

7. The utility rack of claim 6, wherein when the elbows are attached to the members the outer surface of the rack is substantially continuous.

\* \* \* \* \*